United States Patent
Park et al.

(10) Patent No.: US 11,005,622 B2
(45) Date of Patent: May 11, 2021

(54) REFERENCE SIGNAL SEQUENCE DESIGN FOR NEW RADIO SYSTEMS

(71) Applicant: QUALCOMM Incorporated, San Diego, CA (US)

(72) Inventors: Seyong Park, San Diego, CA (US); Wei Yang, San Diego, CA (US); Yi Huang, San Diego, CA (US); Renqiu Wang, San Diego, CA (US); Sony Akkarakaran, Poway, CA (US); Xiao Feng Wang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 16/227,803

(22) Filed: Dec. 20, 2018

(65) Prior Publication Data

US 2019/0207730 A1    Jul. 4, 2019

Related U.S. Application Data

(60) Provisional application No. 62/755,178, filed on Nov. 2, 2018, provisional application No. 62/611,519, filed on Dec. 28, 2017.

(51) Int. Cl.
*H04L 5/00* (2006.01)
*H04J 13/00* (2011.01)
(Continued)

(52) U.S. Cl.
CPC ........ *H04L 5/0048* (2013.01); *H04J 13/0055* (2013.01); *H04L 5/0091* (2013.01);
(Continued)

(58) Field of Classification Search
CPC .............. H04L 5/0048; H04L 27/3444; H04L 27/2613; H04L 27/18; H04J 13/0055; H04J 13/0077
See application file for complete search history.

(56) References Cited

U.S. PATENT DOCUMENTS

| 8,379,591 B2 | 2/2013 | Iwai et al. |
| 2010/0098139 A1* | 4/2010 | Braithwaite ........ H04L 27/2621 375/219 |

(Continued)

OTHER PUBLICATIONS

Huawei et al., "Design of UL DMRS Sequence for Data Transmission", 3GPP Draft, R1-1720635, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051369254, 11 Pages, Retrieved from the Internet: URL:http://www.3gpp.org/ftp/tsg%5Fran/WG1%5FRL1/TSGR1%5F91/Docs/ [retrieved Nov. 17, 2017], Section 3.

(Continued)

*Primary Examiner* — Diane L Lo
*Assistant Examiner* — Abusayeed M Haque
(74) *Attorney, Agent, or Firm* — Linda G. Gunderson; Holland & Hart LLP

(57) ABSTRACT

Methods, systems, and devices for wireless communications are described. A transmitting device may identify a set of allocated resource blocks and a number of the allocated resource blocks. The transmitting device may determine a bit sequence length corresponding to the number of allocated resource blocks. The transmitting device may generate a reference signal based on a bit sequence having the bit sequence length and transmit the reference signal within the allocated resource blocks. The transmitting device may modulate the bit sequence using a π/2 binary phase shift keying modulation scheme. The transmitting device may
(Continued)

modulate a data bit sequence using the same modulation scheme to generate a modulated data bit sequence, where a peak to average power ratio (PAPR) of tones transporting the modulated data bit sequence satisfies a PAPR threshold and a PAPR of tones transporting the reference signal also satisfies the PAPR threshold.

27 Claims, 22 Drawing Sheets

(51) Int. Cl.
H04L 27/26 (2006.01)
H04L 27/18 (2006.01)
H04L 27/34 (2006.01)

(52) U.S. Cl.
CPC ............ *H04L 27/18* (2013.01); *H04L 27/261* (2013.01); *H04L 27/2613* (2013.01); *H04L 27/2614* (2013.01); *H04L 27/3444* (2013.01)

(56) References Cited

U.S. PATENT DOCUMENTS

| | | | | |
|---|---|---|---|---|
| 2010/0135359 A1* | 6/2010 | Nakao | .................. | H04J 13/0059 375/130 |
| 2010/0213056 A1* | 8/2010 | Segawa | .............. | G01N 33/5438 204/403.01 |
| 2011/0211549 A1* | 9/2011 | Au | ........................ | H04L 5/0058 370/329 |
| 2011/0310828 A1* | 12/2011 | Lin | ....................... | H04W 28/06 370/329 |
| 2013/0128852 A1* | 5/2013 | Xue | .................. | H04W 72/1252 370/329 |
| 2013/0266083 A1* | 10/2013 | Baik | ................... | H04L 27/2649 375/260 |
| 2015/0381310 A1* | 12/2015 | Hammarwall | ...... | H04W 72/082 370/329 |
| 2017/0295047 A1* | 10/2017 | Zeng | .................... | H04L 27/2078 |
| 2018/0062902 A1* | 3/2018 | Gagiev | .................... | H04L 23/00 |
| 2019/0223050 A1* | 7/2019 | Wikstrom | ............. | H04L 5/0044 |
| 2020/0076558 A1* | 3/2020 | Kuchi | ................... | H04L 27/265 |

OTHER PUBLICATIONS

International Search Report and Written Opinion—PCT/US2018/067141—ISA/EPO—dated Mar. 26, 2019.

Qualcomm Incorporated: "Lower PAPR Reference Signals", 3GPP Draft; R1-1813898 Lower PAPR Reference Signals, 3rd Generation Partnership Project (3GPP), Mobile Competence Centre; 650, Route Des Lucioles; F-06921 Sophia-Antipolis Cedex; France, vol. RAN WG1, No. Spokane, WA, USA; Nov. 12, 2018-Nov. 16, 2018, Nov. 11, 2018, XP051555798, Retrieved from the Internet: URL:http://www.3gpp.org/ftp/Meetings%5F3GPP%5FSYNC/RAN1/Docs/R1%2D1813898%2Ezip [retrieved on Nov. 11, 2018], Section 3, 25 pages.

Qualcomm Incorporated: "Low PAPR Modulation", 3GPP Draft; R1-1718594, Low PAPR Modulation, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, XP051353156, Retrieved from the Internet: URL:http://www.3gpp.org/ftp/tsg_ran/WG1_RL1/TSGR1_90b/Docs/ [retrieved on Oct. 3, 2017], 9 pages, Section 3.

Qualcomm Incorporated: "Remaining Issues on DMRS Design", 3GPP Draft, R1-1721432, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Dec. 5, 2017 (Dec. 5, 2017), XP051370808, pp. 1-29, Retrieved from the Internet: URL:http://www.3gpp.org/ftp/tsg%5Fran/WG1%5FRL1/TSGR1%5F91/Docs/ [retrieved on Dec. 5, 2017], Section 7.3.

\* cited by examiner

| Index 405 | 12 Bit Sequences 410 |
|---|---|
| 0  | 0 1 0 0 1 0 0 1 0 0 0 0 |
| 1  | 0 1 1 0 1 0 0 1 0 0 0 0 |
| 2  | 0 1 0 1 1 0 0 1 0 0 0 0 |
| 3  | 0 1 1 0 0 1 0 1 0 0 0 0 |
| 4  | 0 1 0 0 1 1 0 1 0 0 0 0 |
| 5  | 0 1 1 0 1 1 0 1 0 0 0 0 |
| 6  | 0 1 0 1 0 0 1 1 0 0 0 0 |
| 7  | 0 1 0 0 1 0 1 1 0 0 0 0 |
| 8  | 0 1 1 0 1 0 1 1 0 0 0 0 |
| 9  | 0 1 0 1 1 0 1 1 0 0 0 0 |
| 10 | 0 1 0 0 1 0 0 0 1 0 0 0 |
| 11 | 0 1 1 0 1 0 0 0 1 0 0 0 |
| 12 | 0 1 0 1 1 0 0 0 1 0 0 0 |
| 13 | 0 1 0 0 0 1 0 0 1 0 0 0 |
| 14 | 0 1 1 1 0 1 0 0 1 0 0 0 |
| 15 | 0 1 0 1 1 1 0 0 1 0 0 0 |
| 16 | 0 1 1 0 0 0 1 0 1 0 0 0 |
| 17 | 0 1 1 1 0 0 1 0 1 0 0 0 |
| 18 | 0 1 1 1 0 1 1 0 1 0 0 0 |
| 19 | 0 1 0 0 1 1 1 0 1 0 0 0 |
| 20 | 0 1 1 0 1 1 1 0 1 0 0 0 |
| 21 | 0 1 0 1 0 0 0 1 1 0 0 0 |
| 22 | 0 1 0 0 0 1 0 1 1 0 0 0 |
| 23 | 0 1 0 1 1 1 0 1 1 0 0 0 |
| 24 | 0 1 0 1 0 0 1 1 0 0 0 0 |
| 25 | 0 1 0 0 1 0 1 1 1 0 0 0 |
| 26 | 0 1 1 0 1 0 1 1 1 0 0 0 |
| 27 | 0 1 0 1 1 0 1 1 1 0 0 0 |
| 28 | 0 1 0 0 0 1 0 0 0 1 0 0 |
| 29 | 0 1 1 1 0 0 0 1 0 1 0 0 |

FIG. 4

| Index 505 | 18 Bit Sequences 510 |
|---|---|
| 0  | 0 1 0 1 0 1 1 0 0 1 0 1 1 0 0 1 1 1 |
| 1  | 0 1 0 1 0 1 1 0 0 1 0 1 1 0 0 1 1 1 |
| 2  | 0 1 1 1 1 0 1 0 1 1 0 0 1 1 0 0 1 0 |
| 3  | 0 1 1 1 1 0 1 0 1 1 0 0 1 1 0 0 1 0 |
| 4  | 0 1 1 0 0 1 1 0 1 0 0 1 0 1 0 1 1 1 |
| 5  | 0 1 0 0 1 1 0 1 0 1 1 0 0 0 1 1 1 0 |
| 6  | 0 1 0 0 1 1 0 1 0 1 1 1 0 0 0 1 1 0 |
| 7  | 0 1 1 0 1 0 0 0 1 0 1 0 0 1 0 0 0 1 |
| 8  | 0 1 1 0 0 0 1 1 0 1 1 0 1 0 1 1 1 0 |
| 9  | 0 1 1 0 1 0 1 1 0 1 1 1 0 0 1 0 1 |
| 10 | 0 1 1 0 1 0 0 1 1 1 0 1 1 1 0 1 0 1 |
| 11 | 0 0 0 0 0 0 0 0 0 0 0 0 0 0 0 0 0 0 |
| 12 | 0 1 1 1 0 0 1 0 1 1 0 0 1 1 0 1 0 1 |
| 13 | 0 1 0 0 1 0 1 0 0 0 1 1 1 0 1 0 0 1 |
| 14 | 0 1 0 0 1 0 1 0 0 0 1 1 1 0 1 0 0 1 |
| 15 | 0 1 1 1 0 1 0 0 1 0 0 0 1 1 0 0 1 0 |
| 16 | 0 1 1 1 0 1 0 1 1 0 0 1 1 1 0 1 1 0 |
| 17 | 0 1 1 0 1 0 1 1 0 0 1 0 1 1 1 0 0 0 |
| 18 | 0 1 1 0 0 0 1 0 1 0 0 1 0 0 0 1 0 1 |
| 19 | 0 0 1 0 1 1 0 0 1 1 0 1 0 1 0 0 1 1 |
| 20 | 0 1 1 0 0 1 1 1 0 0 1 0 0 1 0 1 0 |
| 21 | 0 1 1 0 0 1 0 1 0 1 0 0 1 0 0 1 1 1 |
| 22 | 0 1 1 0 0 1 0 1 1 1 1 0 0 1 1 0 1 0 |
| 23 | 0 1 1 0 0 1 1 1 1 0 1 0 0 1 1 0 1 0 |
| 24 | 0 1 1 0 1 1 1 0 1 0 0 1 0 1 0 0 0 1 |
| 25 | 0 1 0 1 0 0 1 0 1 1 1 0 1 1 0 0 1 1 |
| 26 | 0 1 1 1 0 0 1 0 0 1 0 1 0 1 1 1 0 0 |
| 27 | 0 1 0 1 1 1 1 0 0 1 1 0 0 1 0 1 0 1 |
| 28 | 0 1 0 0 1 1 0 1 0 1 0 1 1 0 0 0 0 1 |
| 29 | 0 1 1 0 0 0 0 1 1 0 1 0 1 0 1 1 0 0 |

FIG. 5

| Index 605 | 24 Bit Sequences 610 |
|---|---|
| 0  | 0 1 1 0 1 0 0 1 1 0 0 1 1 1 1 0 1 0 1 0 0 0 0 0 |
| 1  | 0 1 1 1 0 1 0 1 1 0 0 1 1 1 0 1 1 0 1 0 0 0 0 0 |
| 2  | 0 1 1 1 1 0 1 0 1 1 0 0 1 1 0 0 1 0 1 0 0 0 0 0 |
| 3  | 0 1 0 1 1 0 0 0 0 1 0 1 0 1 1 0 0 1 1 0 0 0 0 0 |
| 4  | 0 1 1 0 0 1 1 0 1 0 1 0 0 0 0 1 1 0 1 0 0 0 0 0 |
| 5  | 0 0 1 1 1 0 0 1 0 1 1 0 0 1 1 0 1 0 1 0 0 0 0 0 |
| 6  | 0 1 0 1 0 0 1 0 0 0 1 1 0 0 1 0 1 1 1 0 0 0 0 0 |
| 7  | 0 1 1 1 0 1 0 0 1 0 0 0 1 1 0 0 1 0 1 0 0 0 0 0 |
| 8  | 0 1 1 0 1 0 1 1 1 0 1 1 1 0 0 1 0 1 1 0 0 0 0 0 |
| 9  | 0 1 1 0 1 0 0 1 1 1 0 1 1 1 0 1 0 1 1 0 0 0 0 0 |
| 10 | 0 1 1 1 0 1 0 1 1 0 0 1 0 1 1 0 0 0 1 0 0 0 0 0 |
| 11 | 0 1 1 0 0 1 1 0 1 0 0 1 0 1 0 1 1 1 0 0 0 0 0 0 |
| 12 | 0 1 1 0 0 1 0 1 1 1 0 0 1 0 1 0 1 1 0 0 0 0 0 0 |
| 13 | 0 1 1 0 1 0 1 1 0 0 1 0 1 1 1 0 0 0 1 0 0 0 0 0 |
| 14 | 0 1 1 0 0 0 1 0 0 1 0 1 1 1 0 1 0 1 1 0 0 0 0 0 |
| 15 | 0 1 0 1 0 1 1 0 0 1 0 1 1 0 0 1 1 1 0 0 0 0 0 0 |
| 16 | 0 1 1 0 0 1 0 1 1 1 0 1 1 0 0 0 1 0 1 0 0 0 0 0 |
| 17 | 0 1 0 0 1 0 1 0 0 0 1 1 1 0 1 0 0 1 1 0 0 0 0 0 |
| 18 | 0 1 1 0 0 1 0 1 1 1 0 0 0 1 0 1 0 0 1 0 0 0 0 0 |
| 19 | 0 1 0 0 1 1 0 1 0 1 1 0 0 0 1 1 1 0 1 0 0 0 0 0 |
| 20 | 0 1 0 1 1 0 0 1 1 0 1 0 1 0 0 1 1 1 0 0 0 0 0 0 |
| 21 | 0 1 1 0 0 0 1 0 1 0 0 1 0 0 0 1 0 1 1 0 0 0 0 0 |
| 22 | 0 1 1 0 0 1 0 1 1 1 1 0 0 1 1 0 1 0 1 0 0 0 0 0 |
| 23 | 0 1 1 0 1 0 0 0 1 0 0 0 1 1 0 1 0 1 1 0 0 0 0 0 |
| 24 | 0 1 1 1 0 0 1 0 0 1 0 1 0 1 1 1 0 0 1 0 0 0 0 0 |
| 25 | 0 1 1 1 1 0 1 1 0 1 0 1 0 1 1 0 0 1 1 0 0 0 0 0 |
| 26 | 0 1 1 0 0 1 1 1 1 0 0 1 0 0 1 0 1 0 1 0 0 0 0 0 |
| 27 | 0 1 1 0 0 0 0 1 1 0 1 0 1 0 1 1 0 0 1 0 0 0 0 0 |
| 28 | 0 1 0 1 1 1 1 0 0 1 1 0 0 1 0 1 0 1 1 0 0 0 0 0 |
| 29 | 0 1 1 1 0 0 1 0 0 1 0 1 0 1 0 0 1 1 0 0 0 0 0 0 |

| Index 705 | 12 Bit Sequences 710 |
|---|---|
| 0  | 0 1 1 1 1 0 1 0 0 0 1 1 |
| 1  | 0 1 0 1 1 0 1 0 0 0 1 1 |
| 2  | 0 1 1 0 1 0 1 0 0 0 1 1 |
| 3  | 0 1 0 1 0 1 1 0 0 0 1 1 |
| 4  | 0 1 1 1 1 1 1 0 0 0 1 1 |
| 5  | 0 1 0 1 1 1 1 0 0 0 1 1 |
| 6  | 0 1 1 0 0 0 0 0 0 0 1 1 |
| 7  | 0 1 1 1 1 0 0 0 0 0 1 1 |
| 8  | 0 1 0 1 1 0 0 0 0 0 1 1 |
| 9  | 0 1 1 0 1 0 0 0 0 0 1 1 |
| 10 | 0 1 1 1 1 0 1 1 1 0 1 1 |
| 11 | 0 1 0 1 1 0 1 1 1 0 1 1 |
| 12 | 0 1 1 0 1 0 1 1 1 0 1 1 |
| 13 | 0 1 1 1 0 1 1 1 1 0 1 1 |
| 14 | 0 1 0 0 0 1 1 1 1 0 1 1 |
| 15 | 0 1 1 0 1 1 1 1 1 0 1 1 |
| 16 | 0 1 0 1 0 0 0 1 1 0 1 1 |
| 17 | 0 1 0 0 0 0 0 1 1 0 1 1 |
| 18 | 0 1 0 0 0 1 0 1 1 0 1 1 |
| 19 | 0 1 1 1 1 1 0 1 1 0 1 1 |
| 20 | 0 1 0 1 1 1 0 1 1 0 1 1 |
| 21 | 0 1 1 0 0 0 1 0 1 0 1 1 |
| 22 | 0 1 1 1 1 0 1 1 0 1 0 1 1 |
| 23 | 0 1 1 0 1 1 1 0 1 0 1 1 |
| 24 | 0 1 1 0 0 0 0 1 0 1 1 |
| 25 | 0 1 1 1 1 0 0 0 1 0 1 1 |
| 26 | 0 1 0 1 1 0 0 0 1 0 1 1 |
| 27 | 0 1 1 0 1 0 0 0 1 0 1 1 |
| 28 | 0 1 1 1 0 1 1 1 0 1 1 1 |
| 29 | 0 1 0 0 0 0 1 0 0 1 1 1 |

FIG. 7

| Index 805 | 18 Bit Sequences 810 |
|---|---|
| 0  | 0 1 1 0 1 1 1 0 0 0 0 0 0 0 1 1 0 0 |
| 1  | 0 1 1 0 1 1 1 1 0 0 0 0 0 0 1 1 0 0 |
| 2  | 0 0 0 1 1 1 1 1 0 1 1 0 0 0 1 1 0 0 |
| 3  | 0 0 1 0 0 1 0 1 0 1 1 0 0 0 1 1 0 0 |
| 4  | 0 0 0 1 1 1 0 1 1 0 0 0 0 0 1 1 0 0 |
| 5  | 0 1 1 1 1 1 1 0 0 1 0 0 0 0 1 1 0 0 |
| 6  | 0 0 1 0 0 1 1 1 1 1 1 0 0 0 1 1 0 0 |
| 7  | 0 0 0 1 1 0 1 1 1 1 1 0 0 0 1 1 0 0 |
| 8  | 0 1 1 1 0 1 1 0 1 0 1 1 1 0 1 1 0 0 |
| 9  | 0 0 0 1 1 0 0 0 0 0 1 1 1 0 1 1 0 0 |
| 10 | 0 0 1 0 0 1 1 1 1 0 1 1 1 0 1 1 0 0 |
| 11 | 0 1 1 0 0 0 0 0 0 1 1 1 0 1 1 0 0 0 |
| 12 | 0 1 1 1 0 1 0 1 1 0 0 0 0 0 1 1 0 0 |
| 13 | 0 0 0 0 0 1 1 0 1 0 1 1 1 0 1 1 0 0 |
| 14 | 0 0 0 1 1 0 0 1 0 1 0 1 0 0 1 1 0 0 |
| 15 | 0 1 1 0 1 0 1 1 1 1 0 0 0 1 1 0 0 0 |
| 16 | 0 1 1 1 1 1 0 1 0 1 1 0 0 0 1 1 0 0 |
| 17 | 0 0 0 0 1 0 0 1 0 1 1 0 0 0 1 1 0 0 |
| 18 | 0 1 1 0 1 0 0 1 0 0 0 0 0 0 1 1 0 0 |
| 19 | 0 1 0 1 0 1 1 0 0 1 0 0 0 0 1 1 0 0 |
| 20 | 0 0 1 0 0 1 1 0 1 0 0 0 0 0 1 1 0 0 |
| 21 | 0 0 1 0 1 0 0 1 1 0 1 0 0 0 1 1 0 0 |
| 22 | 0 1 1 0 0 0 0 0 0 1 0 0 0 0 1 1 0 0 |
| 23 | 0 0 0 1 1 0 0 0 0 0 0 0 0 0 1 1 0 0 |
| 24 | 0 1 1 0 0 0 1 0 1 0 0 0 0 0 1 1 0 0 |
| 25 | 0 0 0 1 1 0 0 0 1 0 1 0 0 0 1 1 0 0 |
| 26 | 0 1 1 0 0 0 0 0 1 0 1 0 0 0 1 1 0 0 |
| 27 | 0 1 0 1 0 0 0 0 0 1 1 0 0 0 1 1 0 0 |
| 28 | 0 0 1 0 1 0 0 0 0 1 1 0 0 0 1 1 0 0 |
| 29 | 0 1 0 0 0 0 0 1 1 0 0 0 0 0 1 1 0 0 |

| Index 905 | 24 Bit Sequences 910 |
|---|---|
| 0 | 0 1 0 1 1 0 1 0 1 0 1 0 1 1 0 1 1 0 0 1 0 0 1 1 |
| 1 | 0 1 0 0 0 1 1 0 1 0 1 0 1 1 1 0 1 0 0 1 0 0 1 1 |
| 2 | 0 1 0 0 1 0 0 1 1 1 1 1 1 1 1 1 0 0 1 0 0 1 1 |
| 3 | 0 1 1 0 1 0 1 1 0 1 1 0 0 1 0 1 0 1 0 1 0 0 1 1 |
| 4 | 0 1 0 1 0 1 0 1 1 0 0 1 0 0 1 0 1 0 0 1 0 0 1 1 |
| 5 | 0 0 0 0 1 0 1 0 0 1 0 1 0 1 0 1 1 0 0 1 0 0 1 1 |
| 6 | 0 1 1 0 0 0 0 1 0 0 0 0 0 0 0 1 1 1 0 1 0 0 1 1 |
| 7 | 0 1 0 0 0 1 1 1 1 0 1 1 1 1 1 1 0 0 1 0 0 1 1 |
| 8 | 0 1 0 1 1 0 0 0 1 0 0 0 1 0 1 0 0 1 0 1 0 0 1 1 |
| 9 | 0 1 0 1 1 0 1 0 1 1 1 0 1 1 1 0 0 1 0 1 0 0 1 1 |
| 10 | 0 1 0 0 0 1 1 0 1 0 1 0 0 1 0 1 0 0 0 1 0 0 1 1 |
| 11 | 0 1 0 1 0 1 0 1 1 0 1 0 0 1 1 0 1 1 1 1 0 0 1 1 |
| 12 | 0 1 0 1 0 1 1 0 1 1 1 1 1 0 0 1 1 1 1 1 0 0 1 1 |
| 13 | 0 1 0 1 1 0 0 0 0 0 1 1 1 0 1 0 0 0 1 0 0 1 1 |
| 14 | 0 1 0 1 0 0 0 1 0 1 1 0 1 1 1 0 0 1 0 1 0 0 1 1 |
| 15 | 0 1 1 0 0 1 0 1 0 1 1 0 1 0 1 0 1 1 1 1 0 0 1 1 |
| 16 | 0 1 0 1 0 1 1 0 1 1 0 1 1 1 1 1 0 1 1 0 0 0 1 1 |
| 17 | 0 1 1 1 1 0 0 1 0 0 0 0 1 0 0 1 0 1 0 1 0 0 1 1 |
| 18 | 0 1 0 1 0 1 1 0 1 1 1 1 0 1 1 0 0 0 0 1 0 0 1 1 |
| 19 | 0 1 1 1 1 1 0 0 1 0 1 0 0 0 0 1 0 0 1 0 0 1 1 |
| 20 | 0 1 1 0 1 0 1 0 1 0 0 1 1 0 1 0 1 1 1 1 0 0 1 1 |
| 21 | 0 1 0 1 0 0 0 1 1 0 1 0 0 0 1 0 0 1 0 1 0 0 1 1 |
| 22 | 0 1 0 1 0 1 1 0 1 1 0 1 0 1 0 1 1 0 0 1 0 0 1 1 |
| 23 | 0 1 0 1 1 0 1 1 1 0 1 1 1 1 1 0 0 1 0 1 0 0 1 1 |
| 24 | 0 1 0 0 0 0 0 1 0 1 1 0 0 1 0 0 0 0 0 1 0 0 1 1 |
| 25 | 0 1 0 0 1 0 0 0 0 1 1 0 0 1 0 1 0 1 0 1 0 0 1 1 |
| 26 | 0 1 0 1 0 1 0 0 1 0 1 0 0 0 1 1 0 0 1 0 0 1 1 |
| 27 | 0 1 0 1 0 0 1 0 1 0 0 1 1 0 0 0 0 0 0 1 0 0 1 1 |
| 28 | 0 1 1 0 1 1 0 1 0 1 0 1 0 1 1 0 0 1 0 1 0 0 1 1 |
| 29 | 0 1 0 0 0 0 0 1 0 1 1 0 0 1 1 1 1 1 1 0 0 1 1 |

FIG. 9

REFERENCE SIGNAL SEQUENCE DESIGN FOR NEW RADIO SYSTEMS

CROSS REFERENCES

The present Application for Patent claims the benefit of U.S. Provisional Patent Application No. 62/611,519 by PARK, et al., entitled "REFERENCE SIGNAL SEQUENCE DESIGN FOR NEW RADIO SYSTEMS," filed Dec. 28, 2017, and to U.S. Provisional Patent Application No. 62/755,178 by PARK, et al., entitled "REFERENCE SIGNAL SEQUENCE DESIGN FOR NEW RADIO SYSTEMS" filed Nov. 2, 2018, and assigned to the assignee hereof, and expressly incorporated herein by reference.

BACKGROUND

The following relates generally to wireless communication, and more specifically to reference signal sequence design for new radio systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a transmitter, such as a UE or a base station, may transmit one or more reference signals to provide a receiver, such as a UE or a base station, with an amplitude and phase reference for performing channel estimation of a wireless channel. The receiver may use the channel estimate to remove amplitude and/or phase distortion to a signal caused by transmission of the signal via the wireless channel. In LTE systems, for example, a transmitter may generate a reference signal by performing quadrature phase shift keying (QPSK) modulation on a Zadoff-Chu sequence. An issue with conventional reference signal generation is that pilot tones that transport a QPSK based reference signal may have a large peak to average power ratio (PAPR), and may not be suitable for use in NR systems. Moreover, LTE systems apply different modulation schemes for modulating reference signals and data, resulting in tones that transport reference signals having a PAPR that may significantly exceed a PAPR of tones that transport data. Conventional techniques for generating reference signals are thus not suitable for NR systems.

SUMMARY

The described techniques relate to improved methods, systems, devices, or apparatuses that support improved reference signal sequence design for new radio systems. Generally, the described techniques provide for generating a reference signal using a bit sequence having an autocorrelation property, where a length of the bit sequence corresponds to a number of allocated resource blocks within which data and the reference signal are to be transmitted. Tones transporting the reference signal and a data transmission may both have a PAPR that satisfies a PAPR threshold, and the reference signal design techniques described herein may be suitable for use in NR systems and/or other wireless communication systems.

In an example, a base station and a user equipment (UE) may communicate within a system bandwidth that is divided into a set of resource blocks. When a transmission is to be sent to or a transmission is to be received from the UE, the base station may allocate one or more of the resource blocks for the transmission. At least one reference signal may be communicated within the allocated resource blocks for performing channel estimation. A length of a bit sequence used to generate the reference signal may be a function of the number of allocated resource blocks. The bit sequence length may be shorter for a smaller number of allocated resource blocks, and larger for a greater number of allocated resource blocks.

The base station may determine a bit sequence length corresponding to the number of allocated resource blocks, and may generate a reference signal based at least in part on a bit sequence having the bit sequence length. The UE may also determine the bit sequence length based on the number of allocated resource blocks, or the base station may signal the bit sequence length to the UE.

Each of the base station and the UE may store a set of bit sequence tables, and each bit sequence table may list a set of sequences that each have the same number of bits. The tables may include the set of bit sequences that may be used to generate a reference signal. The bit sequences in each table may have different bit lengths than the bit sequences in the other tables. Each bit sequence in each table may have an autocorrelation property such that a bit sequence is orthogonal to at least one cyclically shifted version of itself.

In some examples, the base station may signal an index value to indicate which bit sequence within a bit sequence table is to be used for generating the reference signal. The base station may semi-statically configure the UE with the index value, or may communicate control information (e.g., downlink control information) to dynamically indicate the index value to the UE. Based on the number of allocated resource blocks, the bit sequence length, and the index value, the UE may determine from the tables the bit sequence being used to generate a reference signal. The UE may thus expect to receive from the base station a reference signal generated using a bit sequence corresponding to the index value for processing downlink transmissions, or may generate a reference signal using a bit sequence corresponding to the index value when transmitting uplink transmissions to the base station. The receiver may use the reference signal for channel estimation for removing amplitude and/or phase distortion of the transmission caused by the wireless channel.

In some examples, the base station, the UE, or both, may generate the reference signal by modulating a bit sequence using $\pi/2$ binary phase-shift keying (BPSK) modulation. The base station, the UE, or both, may also modulate data bit sequence for transmission within the allocated resource blocks using $\pi/2$ BPSK modulation. Beneficially, tones communicating the reference signal may have a similar PAPR as tones communicating data.

A method of wireless communication is described. The method may include identifying a plurality of allocated resource blocks and a number of the allocated resource blocks, determining a bit sequence length corresponding to the number of allocated resource blocks, generating a reference signal based at least in part on a bit sequence having the bit sequence length, and transmitting the reference signal within the allocated resource blocks.

An apparatus for wireless communication is described. The apparatus may include means for identifying a plurality of allocated resource blocks and a number of the allocated resource blocks, means for determining a bit sequence length corresponding to the number of allocated resource blocks, means for generating a reference signal based at least in part on a bit sequence having the bit sequence length, and means for transmitting the reference signal within the allocated resource blocks.

Another apparatus for wireless communication is described. The apparatus may include a processor, memory in electronic communication with the processor, and instructions stored in the memory. The instructions may be operable to cause the processor to identify a plurality of allocated resource blocks and a number of the allocated resource blocks, determine a bit sequence length corresponding to the number of allocated resource blocks, generate a reference signal based at least in part on a bit sequence having the bit sequence length, and transmit the reference signal within the allocated resource blocks.

A non-transitory computer-readable medium for wireless communication is described. The non-transitory computer-readable medium may include instructions operable to cause a processor to identify a plurality of allocated resource blocks and a number of the allocated resource blocks, determine a bit sequence length corresponding to the number of allocated resource blocks, generate a reference signal based at least in part on a bit sequence having the bit sequence length, and transmit the reference signal within the allocated resource blocks.

In some examples of the method, apparatus, and non-transitory computer-readable medium described above, the bit sequence may be orthogonal to at least one cyclically shifted version of the bit sequence.

In some examples of the method, apparatus, and non-transitory computer-readable medium described above, generating the reference signal includes modulating the bit sequence using a modulation scheme to generate the reference signal.

Some examples of the method, apparatus, and non-transitory computer-readable medium described above may further include processes, features, means, or instructions for modulating a data bit sequence using the modulation scheme to generate a modulated data bit sequence. Some examples of the method, apparatus, and non-transitory computer-readable medium described above may further include processes, features, means, or instructions for transmitting the modulated data bit sequence within the allocated resource blocks, wherein a PAPR of tones transporting the modulated data sequence within the allocated resource blocks satisfies a PAPR threshold and a PAPR of tones transporting the reference signal within the allocated resource blocks satisfies the PAPR threshold.

In some examples of the method, apparatus, and non-transitory computer-readable medium described above, the modulation scheme may be a $\pi/2$ binary phase shift keying modulation scheme.

Some examples of the method, apparatus, and non-transitory computer-readable medium described above may further include processes, features, means, or instructions for identifying a bit sequence table from a plurality of bit sequence tables based at least in part on the bit sequence length. Some examples of the method, apparatus, and non-transitory computer-readable medium described above may further include processes, features, means, or instructions for selecting the bit sequence from a plurality of bit sequences included in the bit sequence table.

In some examples of the method, apparatus, and non-transitory computer-readable medium described above, each bit sequence of the plurality of bit sequences included in the bit sequence table satisfies a cyclic autocorrelation threshold, or a frequency domain fluctuation threshold, or a cyclic cross-correlation threshold, or a PAPR threshold, or any combination thereof.

In some examples of the method, apparatus, and non-transitory computer-readable medium described above, each of the plurality of bit sequence tables corresponds to a different bit sequence length.

In some examples of the method, apparatus, and non-transitory computer-readable medium described above, the bit sequence length may be 12 bits, or 18 bits, or 24 bits.

In some examples of the method, apparatus, and non-transitory computer-readable medium described above, identifying the number of allocated resource blocks includes determining that the number of allocated resource blocks satisfies a threshold.

Some examples of the method, apparatus, and non-transitory computer-readable medium described above may further include processes, features, means, or instructions for transmitting control information indicating the number of allocated resource blocks. Some examples of the apparatus described above may further include a transmitter to transmit control information indicating the number of allocated resource blocks.

Some examples of the method, apparatus, and non-transitory computer-readable medium described above may further include processes, features, means, or instructions for transmitting control information indicating an index to a table to identify the bit sequence from a plurality of bit sequences included in the table.

Some examples of the method, apparatus, and non-transitory computer-readable medium described above may further include processes, features, means, or instructions for receiving a measurement report that includes a channel estimate determined based at least in part on the reference signal.

A method of wireless communication is described. The method may include identifying a plurality of allocated resource blocks and a number of the allocated resource blocks, determining a bit sequence length corresponding to the number of allocated resource blocks, and monitoring the allocated resource blocks for a reference signal that is generated based at least in part on a bit sequence having the bit sequence length.

An apparatus for wireless communication is described. The apparatus may include means for identifying a plurality of allocated resource blocks and a number of the allocated resource blocks, means for determining a bit sequence length corresponding to the number of allocated resource blocks, and means for monitoring the allocated resource blocks for a reference signal that is generated based at least in part on a bit sequence having the bit sequence length.

Another apparatus for wireless communication is described. The apparatus may include a processor, memory in electronic communication with the processor, and instructions stored in the memory. The instructions may be operable to cause the processor to identify a plurality of allocated resource blocks and a number of the allocated resource blocks, determine a bit sequence length corresponding to the number of allocated resource blocks, and monitor the allocated resource blocks for a reference signal that is generated based at least in part on a bit sequence having the bit sequence length.

A non-transitory computer-readable medium for wireless communication is described. The non-transitory computer-readable medium may include instructions operable to cause a processor to identify a plurality of allocated resource blocks and a number of the allocated resource blocks, determine a bit sequence length corresponding to the number of allocated resource blocks, and monitor the allocated resource blocks for a reference signal that is generated based at least in part on a bit sequence having the bit sequence length.

In some examples of the method, apparatus, and non-transitory computer-readable medium described above, the bit sequence may be orthogonal to at least one cyclically shifted version of the bit sequence.

In some examples of the method, apparatus, and non-transitory computer-readable medium described above, the reference signal may be generated based at least in part on modulating the bit sequence using a modulation scheme.

Some examples of the method, apparatus, and non-transitory computer-readable medium described above may further include processes, features, means, or instructions for receiving the reference signal and a modulated data bit sequence within the allocated resource blocks, wherein a PAPR of tones transporting the modulated data sequence within the allocated resource blocks satisfies a PAPR threshold and a PAPR of tones transporting the reference signal within the allocated resource blocks satisfies the PAPR threshold.

Some examples of the method, apparatus, and non-transitory computer-readable medium described above may further include processes, features, means, or instructions for determining a channel estimate based at least in part on the reference signal. Some examples of the method, apparatus, and non-transitory computer-readable medium described above may further include processes, features, means, or instructions for decoding the modulated data bit sequence from the allocated resource blocks based at least in part on the channel estimate.

In some examples of the method, apparatus, and non-transitory computer-readable medium described above, the modulation scheme may be a $\pi/2$ binary phase shift keying modulation scheme.

Some examples of the method, apparatus, and non-transitory computer-readable medium described above may further include processes, features, means, or instructions for identifying a bit sequence table from a plurality of bit sequence tables based at least in part on the bit sequence length. Some examples of the method, apparatus, and non-transitory computer-readable medium described above may further include processes, features, means, or instructions for selecting the bit sequence from a plurality of bit sequences included in the bit sequence table.

In some examples of the method, apparatus, and non-transitory computer-readable medium described above, each of the plurality of bit sequence tables corresponds to a different bit sequence length.

In some examples of the method, apparatus, and non-transitory computer-readable medium described above, each bit sequence of the plurality of bit sequences included in the bit sequence table satisfies a cyclic autocorrelation threshold, or a frequency domain fluctuation threshold, or a cyclic cross-correlation threshold, or a PAPR threshold, or any combination thereof.

In some examples of the method, apparatus, and non-transitory computer-readable medium described above, the bit sequence length may be 12 bits, or 18 bits, or 24 bits.

In some examples of the method, apparatus, and non-transitory computer-readable medium described above, determining the bit sequence length includes determining the bit sequence length based at least in part on the number of allocated resource blocks.

In some examples of the method, apparatus, and non-transitory computer-readable medium described above, identifying the number of allocated resource blocks includes receiving control information indicating the number of allocated resource blocks. Some examples of the apparatus described above may further include a receiver to receive control information indicating the number of allocated resource blocks.

Some examples of the method, apparatus, and non-transitory computer-readable medium described above may further include processes, features, means, or instructions for receiving control information indicating an index to a table to identify the bit sequence from a plurality of bit sequences included in the table.

In some examples of the method, apparatus, and non-transitory computer-readable medium described above, identifying the number of allocated resource blocks includes determining that the number of allocated resource blocks satisfies a threshold.

A method of wireless communication at a wireless device is described. The method may include identifying a set of allocated resource blocks and a number of the allocated resource blocks, determining a bit sequence length corresponding to the number of allocated resource blocks, selecting a bit sequence from a bit sequence table including a set of bit sequences having the bit sequence length, modulating the bit sequence using a $\pi/2$ binary phase shift keying modulation scheme, generating a reference signal based on the modulated bit sequence, and transmitting the reference signal within the allocated resource blocks.

An apparatus for wireless communication at a wireless device is described. The apparatus may include a processor, memory in electronic communication with the processor, and instructions stored in the memory. The instructions may be executable by the processor to cause the apparatus to identify a set of allocated resource blocks and a number of the allocated resource blocks, determine a bit sequence length corresponding to the number of allocated resource blocks, select a bit sequence from a bit sequence table including a set of bit sequences having the bit sequence length, modulate the bit sequence using a $\pi/2$ binary phase shift keying modulation scheme, generate a reference signal based on the modulated bit sequence, and transmit the reference signal within the allocated resource blocks.

Another apparatus for wireless communication at a wireless device is described. The apparatus may include means for identifying a set of allocated resource blocks and a number of the allocated resource blocks, determining a bit sequence length corresponding to the number of allocated resource blocks, selecting a bit sequence from a bit sequence table including a set of bit sequences having the bit sequence length, modulating the bit sequence using a $\pi/2$ binary phase shift keying modulation scheme, generating a reference signal based on the modulated bit sequence, and transmitting the reference signal within the allocated resource blocks.

A non-transitory computer-readable medium storing code for wireless communication at a wireless device is described. The code may include instructions executable by a processor to identify a set of allocated resource blocks and a number of the allocated resource blocks, determine a bit sequence length corresponding to the number of allocated resource blocks, select a bit sequence from a bit sequence table including a set of bit sequences having the bit sequence length, modulate the bit sequence using a π/2 binary phase shift keying modulation scheme, generate a reference signal based on the modulated bit sequence, and transmit the reference signal within the allocated resource blocks.

In some examples of the method, apparatuses, and non-transitory computer-readable medium described herein, the modulated bit sequence may be orthogonal to at least one cyclically shifted version of the modulated bit sequence.

Some examples of the method, apparatuses, and non-transitory computer-readable medium described herein may further include operations, features, means, or instructions for modulating a data bit sequence using the π/2 binary phase shift keying modulation scheme to generate a modulated data bit sequence, where the reference signal may be a demodulation reference signal, and transmitting the modulated data bit sequence within the allocated resource blocks, where a peak to average power ratio (PAPR) of tones transporting the modulated data bit sequence within the allocated resource blocks satisfies a PAPR threshold and a PAPR of tones transporting the reference signal within the allocated resource blocks satisfies the PAPR threshold.

Some examples of the method, apparatuses, and non-transitory computer-readable medium described herein may further include operations, features, means, or instructions for identifying the bit sequence table from a set of bit sequence tables based on the bit sequence length, where each of the set of bit sequence tables corresponds to a different bit sequence length.

In some examples of the method, apparatuses, and non-transitory computer-readable medium described herein, the bit sequence length may be 12 bits, or 18 bits, or 24 bits, and the bit sequence table includes the set of bit sequences of the bit sequence length of 12 bits, or 18 bits, or 24 bits.

A method of wireless communication at a wireless device is described. The method may include identifying a set of allocated resource blocks and a number of the allocated resource blocks, determining a bit sequence length corresponding to the number of allocated resource blocks, selecting a bit sequence from a bit sequence table including a set of bit sequences having the bit sequence length, monitoring the allocated resource blocks for a reference signal that is generated based on modulating the bit sequence with a π/2 binary phase shift keying modulation scheme, receiving the reference signal within the allocated resource blocks based on the monitoring, and determining a channel estimate based on the reference signal.

An apparatus for wireless communication at a wireless device is described. The apparatus may include a processor, memory in electronic communication with the processor, and instructions stored in the memory. The instructions may be executable by the processor to cause the apparatus to identify a set of allocated resource blocks and a number of the allocated resource blocks, determine a bit sequence length corresponding to the number of allocated resource blocks, select a bit sequence from a bit sequence table including a set of bit sequences having the bit sequence length, monitor the allocated resource blocks for a reference signal that is generated based on modulating the bit sequence with a π/2 binary phase shift keying modulation scheme, receive the reference signal within the allocated resource blocks based on the monitoring, and determine a channel estimate based on the reference signal.

Another apparatus for wireless communication at a wireless device is described. The apparatus may include means for identifying a set of allocated resource blocks and a number of the allocated resource blocks, determining a bit sequence length corresponding to the number of allocated resource blocks, selecting a bit sequence from a bit sequence table including a set of bit sequences having the bit sequence length, monitoring the allocated resource blocks for a reference signal that is generated based on modulating the bit sequence with a π/2 binary phase shift keying modulation scheme, receiving the reference signal within the allocated resource blocks based on the monitoring, and determining a channel estimate based on the reference signal.

A non-transitory computer-readable medium storing code for wireless communication at a wireless device is described. The code may include instructions executable by a processor to identify a set of allocated resource blocks and a number of the allocated resource blocks, determine a bit sequence length corresponding to the number of allocated resource blocks, select a bit sequence from a bit sequence table including a set of bit sequences having the bit sequence length, monitor the allocated resource blocks for a reference signal that is generated based on modulating the bit sequence with a π/2 binary phase shift keying modulation scheme, receive the reference signal within the allocated resource blocks based on the monitoring, and determine a channel estimate based on the reference signal.

In some examples of the method, apparatuses, and non-transitory computer-readable medium described herein, the modulated bit sequence may be orthogonal to at least one cyclically shifted version of the modulated bit sequence.

Some examples of the method, apparatuses, and non-transitory computer-readable medium described herein may further include operations, features, means, or instructions for receiving the reference signal and a modulated data bit sequence within the allocated resource blocks, where the reference signal is a demodulation reference signal and a peak to average power ratio (PAPR) of tones transporting the modulated data bit sequence within the allocated resource blocks satisfies a PAPR threshold and a PAPR of tones transporting the reference signal within the allocated resource blocks satisfies the PAPR threshold.

Some examples of the method, apparatuses, and non-transitory computer-readable medium described herein may further include operations, features, means, or instructions for decoding the modulated data bit sequence from the allocated resource blocks based on the channel estimate.

Some examples of the method, apparatuses, and non-transitory computer-readable medium described herein may further include operations, features, means, or instructions for identifying the bit sequence table from a set of bit sequence tables based on the bit sequence length, where each of the set of bit sequence tables corresponds to a different bit sequence length.

In some examples of the method, apparatuses, and non-transitory computer-readable medium described herein, the bit sequence length may be 12 bits, or 18 bits, or 24 bits, and the bit sequence table includes the set of bit sequences of the bit sequence length of 12 bits, or 18 bits, or 24 bits.

BRIEF DESCRIPTION OF THE DRAWINGS

FIGS. 4 through 9 illustrate show bit sequence tables in accordance with aspects of the present disclosure.

DETAILED DESCRIPTION

Figure 1:
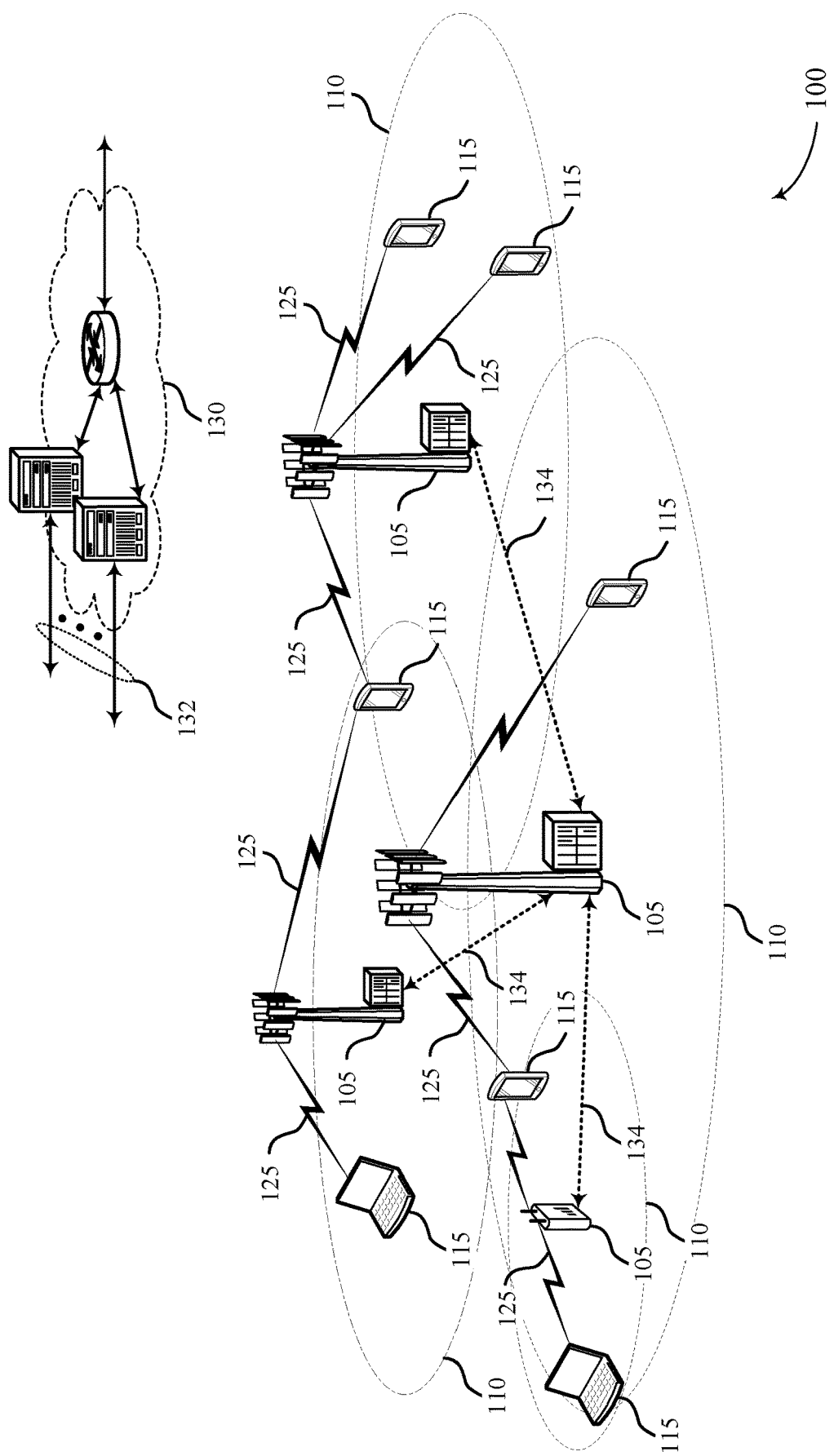
FIG. 1 illustrates an example of a system for wireless communication that supports reference signal sequence design for new radio systems in accordance with aspects of the present disclosure.

The described techniques relate to improved methods, systems, devices, or apparatuses that support improved reference signal sequence design for new radio systems. Generally, the described techniques provide for generating a reference signal using a bit sequence having an autocorrelation property, where a length of the bit sequence corresponds to a number of allocated resource blocks within which data and the reference signal are to be transmitted. Tones transporting the reference signal and a data transmission may both have a PAPR that satisfies a PAPR threshold, and the reference signal design techniques may be suitable for use in New Radio (NR) systems and/or other wireless communication systems.

In some wireless communications systems, a transmitting device may use a different modulation and coding scheme (MCS) for reference signals and data. For example, quadrature phase-shift keying (QPSK) modulation of a Zadoff-Chu sequence may be used to generate a reference signal, and binary phase-shift keying (BPSK) modulation may be used to modulate data. However, tones transporting a QPSK based reference signal may have a much higher peak to average power ratio (PAPR) than tones transporting BPSK modulated data, and may not be suitable for NR systems and/or other wireless communication systems.

To overcome at least these issues, or other issues, the techniques described herein may generate a reference signal using a bit sequence having an autocorrelation property, where a length of the bit sequence corresponds to a number of allocated resource blocks within which data and the reference signal are to be transmitted. In an example, a base station and a user equipment (UE) may communicate within a system bandwidth that is divided into a set of resource blocks. When a transmission is to be sent to or a transmission is to be received from the UE, the base station may allocate one or more of the resource blocks for the transmission. At least one reference signal may be communicated within the allocated resource blocks for performing channel estimation. A length of a bit sequence used to generate the reference signal may be a function of the number of allocated resource blocks. The bit sequence length may be shorter for a smaller number of allocated resource blocks, and larger for a greater number of allocated resource blocks.

The base station may determine a bit sequence length corresponding to the number of allocated resource blocks, and may generate a reference signal based at least in part on a bit sequence having the bit sequence length. For example, if 3, 4, or 5 resource blocks are allocated for the transmission, the bit sequence length may have 12, 18, or 24 bits respectively. The UE may also determine the bit sequence length based on the number of allocated resource blocks, or the base station may signal the bit sequence length to the UE.

Each of the base station and the UE may store a set of bit sequence tables, and each bit sequence table may list a set of bit sequences that each have the same number of bits. The tables may include the set of bit sequences that may be used to generate a reference signal. The bit sequences in each table may have different bit lengths than the bit sequences in the other tables. Each bit sequence in each table may have an autocorrelation property such that a bit sequence is orthogonal to at least one cyclically shifted version of itself. In some cases, each bit sequence in each table may have properties such that the bit sequence is orthogonal to at least one time-delayed version of itself, which may reduce multipath propagation interference introduced by transmitting the reference signal on a wireless channel.

In some examples, the base station may signal an index value to indicate which bit sequence within a bit sequence table is to be used for generating the reference signal. For example, the base station may semi-statically configure the UE with the index value, or may communicate control information (e.g., downlink control information) to dynamically indicate the index value to the UE. Based on the number of allocated resource blocks, the bit sequence length, and the index value, the UE may determine from the tables the bit sequence being used to generate a reference signal. The UE may thus expect to receive from the base station a reference signal generated using a bit sequence corresponding to the index value for processing downlink transmissions, or may generate a reference signal using a bit sequence corresponding to the index value when transmitting uplink transmissions to the base station. The receiver (e.g., either the UE or the base station) may use the reference signal for channel estimation for removing amplitude and/or phase distortion of the transmission caused by the wireless channel.

In some examples, the base station, the UE, or both, may generate a reference signal by modulating a bit sequence using π/2 binary phase-shift keying (BPSK) modulation. The base station, the UE, or both, may also modulate data for transmission within the allocated resource blocks using π/2 BPSK modulation. Beneficially, tones communicating the reference signal may have a similar PAPR as tones communicating data. Although the techniques are described with respect to emerging new radio systems and protocols, the sequence design is not limited to these systems and may be applicable to other systems.

Aspects of the disclosure are initially described in the context of a wireless communications system. Aspects of the disclosure are further illustrated by and described with reference to transmit chains, apparatus diagrams, system diagrams, and flowcharts that relate to reference signal sequence design for new radio systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A transmitting device, which may be UE 115 or base station 105, may generate a reference signal by performing $\pi/2$ BPSK modulation on a bit sequence having an autocorrelation property. In an example, base station 105 and UE 115 may each store a set of tables that each includes sets of bit sequences that may be used to generate a reference signal. The bit sequences within a table may all have the same bit length, and the bit sequences in one table may have a different bit length than the bit sequences included in the other tables. The base station 105 may allocate a number of resource blocks (e.g., for uplink or downlink transmission) to a UE 115, determine a length of a bit sequence corresponding to the number of allocated resource blocks, and select a bit sequence from one of the tables that has bit sequences of the bit sequence length. The base station 105 may transmit a downlink control information to the UE 115 including a grant identifying the allocated resource blocks. The base station 105 may semi-statically configure the UE 115 with an index value that the UE 115 is to use to identify the selected bit sequence for each table, or may transmit the index value in downlink control information.

The UE 115 may determine the bit sequence length, either based on signaling from the base station 105 or as a function of the number of allocated resource blocks. The UE 115 may select the table corresponding to the determined bit sequence length and identify the bit sequence to be used to generate the reference signal based on the index value. Then, either the base station 105 may transmit a downlink reference signal generated based on the bit sequence within the allocated resource blocks, or the UE 115 may transmit an uplink reference signal generated based on the bit sequence within the allocated resource blocks. The base station 105 and/or the UE 115 may then use the reference signal for channel estimation and decoding of a transmission within the allocated resource blocks.

Figure 2:
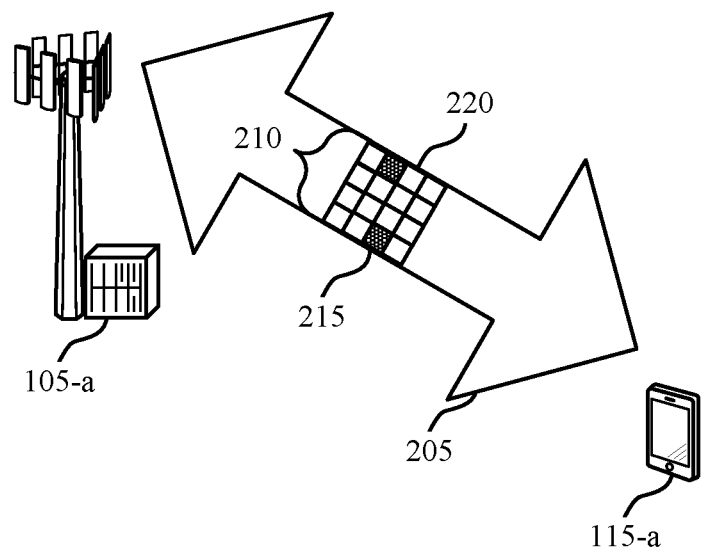
FIG. 2 illustrates an example of a wireless communications system in accordance with aspects of the present disclosure.

FIG. 2 illustrates an example of a wireless communications system 200 in accordance with various aspects of the present disclosure. In some examples, wireless communications system 200 may implement aspects of wireless communications system 100. Wireless communications system 200 includes UE 115-a and base station 105-a, which may be respective examples of a UE 115 and a base station 105 as described herein. UE 115-a and base station 105-a may communicate by a communication link 205. The communication link 205 may be configured for uplink and downlink transmission.

UE 115-a and base station 105-a may implement techniques for $\pi/2$ BPSK modulation, which may enable transmission of reference signals and data using a common modulation scheme to achieve a desired PAPR (e.g., a low PAPR or a PAPR that is less than a PAPR threshold). UE 115-a and base station 105-a may use $\pi/2$ BPSK modulation on a bit sequence of a set of bit sequences specified in a set of tables to generate a reference signal. Each bit sequence of the set may have low PAPR when $\pi/2$ BPSK modulated, and data that is $\pi/2$ BPSK modulated may have similarly low PAPR. In some examples, bit sequences in the tables may also have satisfy an autocorrelation property (e.g., correlation of a bit sequence with at least one cyclically shifted version of itself is less than a cyclic autocorrelation threshold), fluctuation in the frequency domain after DFT-spreading satisfies a threshold (e.g., is less than a frequency domain fluctuation threshold), and cross-correlation with other bit sequences in the table satisfies a cyclic cross-correlation threshold (e.g., is less than the threshold). Described are techniques for determining which bit sequence to use, and techniques for modulating the bit sequence, to generate the reference signal.

In some examples, base station 105-a may allocate one or more resource blocks to the UE 115-a from a system bandwidth for an uplink or downlink transmission. The system bandwidth may be divided into a set of resource blocks that may be allocated for uplink and/or downlink transmission. A time duration of the resource block may correspond to a transmission time interval (TTI) (e.g., a mini-slot, a slot, a subframe, a frame, or the like), and the base station 105-a may allocate the resource blocks to one or more UEs of the wireless communications system 100 in each TTI. In some examples, a resource block may correspond to a defined number of symbol periods and a defined number of subcarriers of a carrier. A resource block may correspond to a set of resource elements, and a resource element may be one subcarrier and one symbol period. Each subcarrier may be a radio frequency used for symbol modulation and may be spaced apart from one another in frequency by a fixed amount. In some examples, a resource block may be the smallest set of time-frequency resources that can be allocated to a UE 115.

Base station 105-a may determine a resource block allocation 210 for UE 115-a. Base station 105-a may determine which resource blocks, and corresponding REs and subcarriers of a carrier, within the system bandwidth to allocate to UE 115-a for carrying a reference signal and an uplink or downlink data transmission. In some examples, the resource block allocation 210 may include a small number of resource blocks, for example including two, three, or four resource blocks, or any number of resource blocks less than or equal to a threshold number of resource blocks (e.g., satisfies a resource block threshold). In some examples, the techniques described herein may be used for small length $\pi/2$ BPSK DMRS sequence design for 5G NR systems.

In some cases, UE 115-a may transmit or receive a reference signal 215 and a data transmission 220 within its resource block allocation 210, where the reference signal 215 may be communicated using a first subset of the resource elements of the resource block allocation 210 and the data transmission 220 may be communicated using a second subset of the resource elements of the resource block allocation 210. The reference signal 215 may be used to generate a channel estimate to enable a receiver to correct amplitude and/or phase distortion of the data transmission 220 caused by the wireless channel.

For an uplink data transmission, UE 115-a may transmit to the base station 105-a a reference signal 215 and the uplink data transmission within its resource block allocation 210, where the reference signal 215 may be communicated using a first subset of the resource elements of the resource block allocation 210 and the uplink data transmission may be communicated using a second subset of the resource elements of the resource block allocation 210.

For a downlink data transmission, UE 115-a may receive from the base station 105-a a reference signal 215 and the downlink data transmission within its resource block allocation 210, where the reference signal 215 may be communicated using a first subset of the resource elements of the resource block allocation 210 and the downlink data transmission may be communicated using a second subset of the resource elements of the resource block allocation 210.

Base station 105-a may transmit to UE 115-a a grant indicating the resource block allocation 210. A grant may identify which resource blocks within the available system bandwidth are allocated to UE 115-a for an uplink and/or downlink data transmission. In some examples, the grant may indicate a bit sequence length of a bit sequence used to generate the reference signal 215. In another example, UE 115-a may determine a length of the bit sequence based on the number of allocated resource blocks.

In an example, the length of the bit sequence may be a function of the number of resource blocks allocated to the UE 115-*a*. The function may be a fixed relationship between the number of resource blocks and the bit sequence length. For example, if UE 115-*a* is allocated one or two resource blocks, UE 115-*a* may determine that the length of the bit sequence used to generate the reference signal is 12 bits (see bit sequence table in FIG. 4). In another example, if UE 115-*a* is allocated three resource blocks, UE 115-*a* may determine that the length of the bit sequence used to generate the reference signal is 18 bits (see bit sequence table in FIG. 5). In another example, if UE 115-*a* is allocated four resource blocks, UE 115-*a* may determine that the length of the bit sequence used to generate the reference signal is 24 bits (see bit sequence table in FIG. 6). If allocated more than a defined number of resource blocks (e.g., more than 4 resource blocks), the length of the bit sequence used to generate the reference signal may be 24 bits, or other techniques may be used for generating the reference signal.

In some cases, for sequences with length 30 or larger, DMRS for π/2 BPSK modulation for PUSCH may be generated based on a Gold-sequence followed by π/2 BPSK modulation then transform precoding, which may result in a DMRS Type 1 comb structure. In some cases, for sequences with length 30 or larger, DMRS for π/2 BPSK modulation for PUCCH may be generated based on Gold-sequence followed by π/2 BPSK modulation then transform precoding. In some cases, for sequences with allocation length 6, 12, 18 and 24, a computer generated sequence (CGS) may be used for DMRS for n/2 BPSK modulation in case of PUSCH and PUCCH transmission.

Figure 6:

UE 115-*a* may determine which of the bit sequence table tables (see FIGS. 4-6) to use based on the bit sequence length corresponding to the number of allocated resource blocks. For example, UE 115-*a* and base station 105-*a* may each have access to, or locally store, a number of bit sequence table tables each corresponding to a different bit sequence lengths as illustrated in FIGS. 4-6.

Base station 105-*a* may indicate an index value to UE 115-*a*, the index value for indexing a bit sequence table to identify a bit sequence from the set of sequences of the determined length included in the bit sequence table. In some cases, base station 105-*a* may semi-statically indicate the index value to UE 115-*a* via RRC signaling, and the semi-statically indicated index value may be the same for each table or may be indicated for each table. In some cases, base station 105-*a* may dynamically transmit the index value in downlink control information (e.g., included in the grant). The bit sequence in the determined table corresponding to the index value may be the bit sequence to be π/2 BPSK modulated to generate a reference signal. In some examples, the bit sequences may be computer generated sequences. The reference signal may be transmitted by either base station 105-*a* or UE 115-*a*. In some examples, the reference signal may be a cell-specific reference signal (CRS) on the downlink or a demodulation reference signal (DMRS) on the uplink.

In a first example, base station 105-*a* may allocate three resource blocks (e.g., the resource block allocation 210) for an uplink data transmission by the UE 115-*a*. Base station 105-*a* may transmit a grant indicating the resource allocation and include an index value for a bit sequence table in the grant. UE 115-*a* may receive the grant and determine the bit sequence length as a function of the number of allocated resource blocks. UE 115-*a* may then select the bit sequence table having bit sequences of that length. For example, may determine that the bit sequence length is 18 bits, and select the table of 18-bit sequences in FIG. 5. In some cases, UE 115-*a* may identify the bit sequence table based on the number of allocated resource blocks. In some other examples, the bit sequence table and/or the bit sequence length may be indicated to the UE 115-*a* in the grant. UE 115-*a* may identify a bit sequence from the identified bit sequence table using the index included in the grant. For example, if the index value is "20," UE 115-*a* may retrieve the sequence corresponding to index value "20" from the 18-bit sequence table. UE 115-*a* may then π/2 BPSK modulate the bit sequence to generate a reference signal using the bit sequence. UE 115-*a* may then transmit the reference signal within the allocated resource blocks, and may also use π/2 BPSK modulation to generate an uplink data transmission for transmission with the allocated resource blocks.

In another example, base station 105-*a* may allocate four resource blocks for downlink data transmission to the UE 115-*a*. Base station 105-*a* may transmit a grant indicating the resource allocation and an index value for a bit sequence table in the grant. UE 115-*a* may identify the number of allocated resource blocks, the bit sequence length corresponding to the number of allocated resource blocks, and the bit sequence table corresponding to the bit sequence length, such as the table of 24-bit sequences in FIG. 6. UE 115-*a* may identify a bit sequence from the bit sequence table using the index value included in the grant or specified in RRC signaling. For example, if the index is the value "12," UE 115-*a* may retrieve the bit sequence corresponding to index "12" from the 24-bit sequence table. Base station 105-*a* may pi/2 BPSK modulate the corresponding bit sequence to generate a reference signal, and transmit the reference signal within the allocated resource blocks. UE 115-*a* may monitor the allocated resource blocks for the reference signal and the downlink data transmission, estimate downlink channel conditions based on the received reference signal, and use the channel estimate for correcting amplitude and phase distortion introduced to the downlink data transmission by the wireless channel during decoding of the downlink data transmission.

Figure 3:
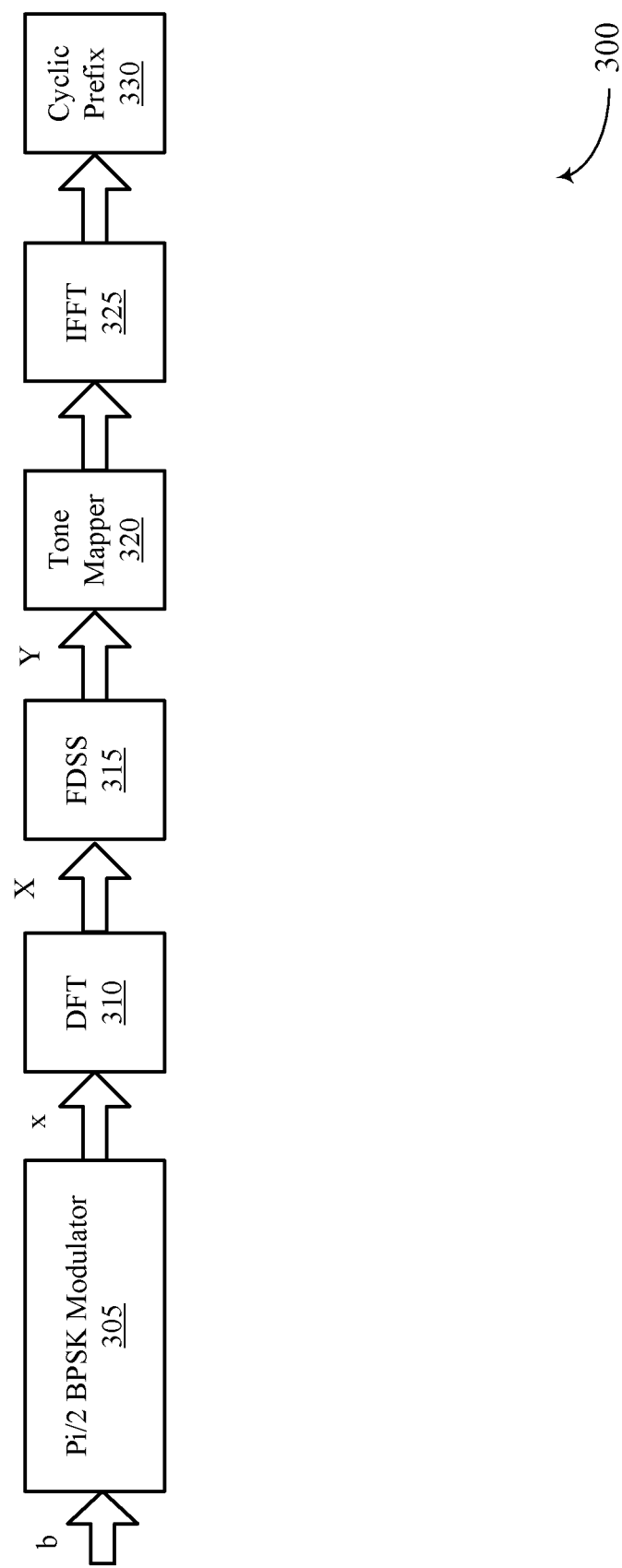
FIG. 3 illustrates an example of a transmit chain in accordance with aspects of the present disclosure.

FIG. 3 illustrates an example of a transmit chain 300 in accordance with various aspects of the present disclosure. In some examples, transmit chain 300 may implement aspects of wireless communications system 100. UE 115, base station 105, or both, may each include the components of transmit chain 300.

A transmitting device, which may be a UE 115 or a base station 105, may determine a bit sequence to π/2 BPSK modulate for generating a reference signal as described in FIG. 2. For example, a base station 105 may determine a number of resource blocks to allocate to a UE 115, determine a bit sequence length corresponding to the number of allocated resource blocks, and select a bit sequence from the table having that bit sequence length (e.g., the tables illustrated in FIGS. 4 through 6). The base station may transmit a grant to the UE 115 indicating the allocated resource blocks. In some cases, the UE 115 may be semi-statically configured with an index value by RRC signaling. In some other examples, the base station 105 may indicate which table to use in downlink control information (DCI) received in a control channel of a TTI (e.g., a slot, a subframe, a frame).

The UE 115 may process the grant to determine which bit sequence table to use (e.g., determine a bit sequence length corresponding to the number of resource blocks allocated in the grant) and identify a bit sequence from the table including bit sequences of the determined length based on the index value. Then, either the base station 105 may transmit a downlink reference signal generated from the identified bit sequence, or the UE 115 may transmit an uplink reference signal generated from the identified bit sequence. The transmitting device may generate the reference signal using transmit chain 300.

In an example, the UE 115 or base station 105 may identify the number of allocated resource blocks and identify a bit sequence to use for generating the reference signal corresponding to the number of allocated resource blocks. To generate the reference signal, the identified bit sequence b may be provided to a π/2 BPSK modulator 305 that may apply π/2 BPSK modulation to the bit sequence b. In some cases, the modulation applied to the bit sequence b may be represented by Equation (1):

$$x(n) = \frac{e^{\frac{jn\pi}{2}}}{\sqrt{2}}[(1-2b(n)) + j(1-2b(n))] \qquad (1)$$

In Equation (1), b may be the bit sequence (e.g., a bit sequence from one of the bit sequence tables of FIGS. 4-6), and n may indicate a particular bit of the bit sequence b. The modulated sequence x may be the π/2 BPSK modulated sequence that is generated from the bit sequence b. For example, a 12 bit sequence may be represented as b=[b(0), b(1), b(2), ..., b(10), b(11)]. With reference to FIG. 4, index value 0 includes the following bit sequence b=[0 1 0 0 1 0 0 1 0 0 0 0]. For example, a first bit in the bit sequence b (e.g., the zeroth bit, or b(0)) may be π/2 BPSK modulated, and the π/2 BPSK modulated bit may correspond to x(0). The π/2 BPSK modulator 305 may π/2 BPSK-modulate each bit in the bit sequence b and output a modulated bit sequence x to a discrete Fourier transform (DFT) component 310.

In some examples, the modulation applied to the bit sequence b may be represented by Equation (2):

$$x(n) = \frac{e^{\frac{jn\pi}{2}(n \bmod 2)}}{\sqrt{2}}[(1-2b(n)) + j(1-2b(n))] \qquad (2)$$

In Equation (2), b may be the bit sequence (e.g., a bit sequence from one of the bit sequence tables of FIGS. 7-9), and n may indicate a particular bit of the bit sequence b. For example, a 12 bit sequence may be represented as b=[b(0), b(1), b(2), ..., b(10), b(11)]. With reference to FIG. 7, index value 0 includes the following bit sequence b=[0 1 1 1 1 0 1 0 0 0 1 1]. For example, a first bit in the bit sequence b (e.g., the zeroth bit, or b(0)) may be π/2 BPSK modulated, and the π/2 BPSK modulated bit may correspond to x(0). The π/2 BPSK modulator 305 may π/2 BPSK-modulate each bit in the bit sequence b and output a modulated bit sequence x to a DFT component 310. The modulated bit sequence x may correspond to the π/2 BPSK modulated sequences from the bit sequence b. As described herein, the operator "mod" may refer to the modulo operation.

The DFT component 310 may apply a DFT operation to the modulated bit sequence x (e.g., time domain data) to generate frequency domain data X that is output to a frequency domain spectral shaping (FDSS) component 315. The FDSS component 315 may perform a FDSS operation on the frequency domain data X to generate spectrally shaped frequency domain data Y. In some examples, FDSS may be a pulse-shaping filtering process implemented in the frequency domain by element-wise multiplication of the frequency domain data X and a bandwidth of the allocated resource blocks. In some cases, π/2 BPSK modulation with FDSS may result in very low PAPR.

A tone mapper 320 may map the spectrally shaped data Y onto respective resource elements of the allocated resource blocks by selecting which subcarriers (e.g., tones) of a carrier are to respectively transport portions of the spectrally shaped data Y. Using the mapping, an inverse fast Fourier transform (IFFT) component 325 may perform an IFFT (or, equivalently, an inverse discrete Fourier Transform (IDFT)) on the spectrally shaped data to generate a time domain waveform. For example, the IFFT component 325 may mix the spectrally shaped data Y with respective subcarriers based on the mapping to generate a set of sinusoids, and sum the sinusoids to generate the time domain waveform. In some cases, a prefix adder 330 may add a cyclic prefix (CP) to the time domain waveform. The CP may be a set of samples which are duplicated from the end of a transmitted symbol and appended cyclically to the beginning of the symbol. A mixer may modulate the output from the prefix adder 330 to radio frequency for transmission of a DFT-S-OFDM waveform by an antenna of the UE 115 or base station 105 via a wireless channel.

FIG. 4 illustrates an example of a bit sequence table 400 in accordance with various aspects of the present disclosure. In some examples, bit sequence table 400 may implement aspects of wireless communications system 100.

Bit sequence table 400 may include a set of bit sequences 410, each of which may have a length of 12 bits. Each bit sequence 410 in sequence table 400 may correspond to a particular index value of index 405. In table 400, the index values may range from 0 to 29. The base station 105-*a* may inform the UE 115-*a* of the index value corresponding to the bit sequence to use for generation of the reference signal, either semi-statically (e.g., via RRC signaling) or dynamically (e.g., via DCI). An index value of "5," for example, may correspond to a bit sequence of [0 1 1 0 1 1 0 1 0 0 0 0] in table 400.

The set of bit sequences 410 included in table 400 may have properties that reduce multipath interference. Multipath interference may occur when a transmitted signal bounces off objects in the path of the transmission from the transmitter to the receiver, and as a result multiple copies of the signal may be received at slightly different (e.g., delayed) times. Each bit sequence 410 in table 400 may be orthogonal to one or more delayed versions of itself to reduce or eliminate multipath interference. In an example, each bit sequence 410 may satisfy an autocorrelation property, such that autocorrelation between a bit sequence and at least one cyclically shifted version sequence of itself (e.g., a delayed or advanced version of itself) may be equal to zero or a constant value. Equation (3) may specify the autocorrelation property for a bit sequences to be included in table 400. For example, the autocorrelation property may specify that, for delays d=−2, −1, 1, and 2, $$\sum_{0 \le n \le L-1} x(n) conj(x(n+d)) = 0 \qquad (3)$$

where L is the number of bits in the bit sequence (e.g., L=12 in this example) and indices n are interpreted as mod(L) (e.g., cyclic). For example, if n=13, 13 mod 12=1, and hence x(13)=x(1).

The following presents an example of this autocorrelation property for the bit sequence at index value 5 where bit sequence b[n]=[0 1 1 0 1 1 0 1 0 0 0 0]. Introducing a delay d may cyclically shift bits in the bit sequence b[n] by the value of d. For example, a one symbol delay (e.g., d=1) may result in the bit sequence b[n−1]=[0 0 1 1 0 1 1 0 1 0 0 0], where b[n−1] shifts each bit of b[n] to the right by one, and the rightmost bit of b[n] becomes the first bit of b[n−1]. To be included in table 400, x[n] and x[n−d] are orthogonal for d=[−2, −1, 1, 2], and thus x[n−2], x[n−1], x[n+1], and x[n+2] may not contribute multipath interference to x[n]. In these examples, x[n] may be the π/2 BPSK modulated sequence from the bit sequence b[n] described in Equation (1).

FIG. 5 illustrates an example of a bit sequence table 500 in accordance with various aspects of the present disclosure. In some examples, bit sequence table 500 may implement aspects of wireless communications system 100.

Bit sequence table 500 may include a set of bit sequences 510, each of which may have a length of 18 bits. Each bit sequence 510 may correspond to a particular index value of index 505 in sequence table 500. In the sequence table 500, the index values may range from 0 to 29. The base station 105-a may inform the UE 115-a of the index value corresponding to the bit sequence to use for generation of the reference signal. An index value of "14," for example, may correspond to a bit sequence of [0 1 1 0 0 1 0 1 1 1 0 0 0 1 0 1 0 0] in sequence table 500.

In this example, cyclic-autocorrelation of the bit sequences 510 may satisfy Equation (4) below for delays d=−3, −2, −1, 1, 2, and 3, where L is the number of bits in the bit sequence (e.g., L=18 in this example) and indices n are interpreted as mod(L) (e.g., cyclic). For example, if n=19, 19 mod 18=1, and then x(19)=x(1). For example, the autocorrelation property may specify that, for delays d=−3, −2, −1, 1, 2, and 3

$$\sum_{0 \le n \le L-1} x(n) conj(x(n+d)) = 0 \text{ or constant} \quad (4)$$

In an example, the autocorrelation for each of the bit sequences 510 may be zero for delays d=−3, −1, 1, and 3, and a constant (e.g., a value of 2) for delays d=−2 and 2. The constant autocorrelation value at delays d=−2 and 2 may be subtracted to remove the multipath interference. To be included in sequence table 500, x[n] and x[n−d] are orthogonal for d=[−3, −1, 1, 3], and thus x[n−3], x[n−1], x[n+1], and x[n+3] may not contribute multipath interference to x[n], and x[n−2] and x[n+2] may contribute to multipath interference to x[n] by a constant amount that may be removed via subtraction of the constant value (e.g., by performing DC cancellation). Bit sequences of other bit sequence lengths may be similarly designed. In these examples, x[n] may be the π/2 BPSK modulated sequence from the bit sequence b[n] according to Equation (1).

FIG. 6 illustrates an example of a bit sequence table 600 in accordance with various aspects of the present disclosure. In some examples, bit sequence table 600 may implement aspects of wireless communications system 100.

Bit sequence table 600 may include a set of bit sequences 610, each of which may have a length of 24 bits. Each bit sequence 6 may correspond to a particular index value of index 605 in sequence table 600. In the sequence table 600, the index values may range from 0 to 29. The base station 105-a may inform the UE 115-a of the index value corresponding to the bit sequence to use for generation of the reference signal. An index value of "0," for example, may correspond to a bit sequence of [0 1 1 0 1 0 0 1 1 0 0 1 1 1 0 1 0 1 0 0 0 0 0 0] in sequence table 600.

The autocorrelation of each of the bit sequences 610 may satisfy Equation (3) above for d=−5, −4, −3, −2, −1, 1, 2, 3, 4, and 5, where L is the number of bits in the bit sequence (e.g., L=24 in this example) and indices are interpreted as mod(L) (e.g., cyclic). For example, if n=27, 27 mod 24=3, and x(27)=x(3). To be included in sequence table 600, x[n] and x[n−d] are orthogonal for d=[−5, −4, −3, −2, −1, 1, 2, 3, 4, 5], and thus x[n−5], x[n−4], x[n−3], x[n−2], x[n−1], x[n+1], x[n+2], x[n+3], x[n+4], x[n+5] may not contribute multipath interference to x[n]. In these examples, x[n] may be the π/2 BPSK modulated sequence from the bit sequence b[n] using Equation (1).

In some examples, bit sequences which differ by a constant phase rotation or a time-domain cyclic shift may be considered identical sequences, as they may result in large cross-correlation, and only one of which may be included in sequence tables 400, 500, and 600.

It is noted that the bit sequence tables 400, 500, and 600 are examples, and that other bit sequences of the respective lengths that satisfy the autocorrelation property described herein may be used instead of or in addition to the listed bit sequences. In some cases, the bit sequence tables 400, 500, and 600 may be examples of bit sequences generated based on Equation (1). Moreover, the techniques described herein may be used to generate bit sequences of other bit sequence lengths.

FIG. 7 illustrates an example of a bit sequence table 700 in accordance with various aspects of the present disclosure. In some examples, bit sequence table 700 may implement aspects of wireless communications system 100.

Bit sequence table 700 may include a set of bit sequences 710, each of which may have a length of 12 bits. Each bit sequence 710 in bit sequence table 700 may correspond to a particular index value of index 705. In bit sequence table 700, the index values may range from 0 to 29. The base station 105-a may inform the UE 115-a of the index value corresponding to the bit sequence to use for generation of the reference signal, either semi-statically (e.g., via RRC signaling) or dynamically (e.g., via DCI). An index value of "5," for example, may correspond to a bit sequence of [0 1 0 1 1 1 1 0 0 0 1 1] in bit sequence table 700.

The set of bit sequences 710 included in bit sequence table 700 may have properties that reduce multipath interference. Multipath interference may occur when a transmitted signal bounces off objects in the path of the transmission from the transmitter to the receiver, and as a result multiple copies of the signal may be received at slightly different (e.g., delayed) times. Each bit sequence 710 in bit sequence table 700 may be orthogonal to one or more delayed versions of itself to reduce or eliminate multipath interference. In an example, each bit sequence 710 may satisfy an autocorrelation property, such that autocorrelation between a bit sequence and at least one cyclically shifted version sequence of itself (e.g., a delayed or advanced version of itself) may be equal to zero or a constant value. Equation (3) above may specify the autocorrelation property for a bit sequences to be included in bit sequence table 700. For example, the autocorrelation property may specify that, for delays d=−2, −1, 1, and 2, Equation (3) above may apply, where L is the number of bits in the bit sequence (e.g., L=12 in this example) and indices n are interpreted as mod(L) (e.g., cyclic). For example, if n=13, 13 mod 12=1, and hence x(13)=x(1).

The following presents an example of this autocorrelation property for the bit sequence at index value 5 where bit sequence b[n]=[0 1 0 1 1 1 1 0 0 0 1 1]. Introducing a delay d may cyclically shift bits in the bit sequence b[n] by the value of d. For example, a one symbol delay (e.g., d=1) may result in the bit sequence b[n−1]=[1 0 1 0 1 1 1 1 0 0 0 1], where b[n−1] shifts each bit of b[n] to the right by one, and the rightmost bit of b[n] becomes the first bit of b[n−1]. To be included in bit sequence table 700, x[n] and x[n−d] are orthogonal for d=[−2, −1, 1, 2], and thus x[n−2], x[n−1], x[n+1], and x[n+2] may not contribute multipath interference to x[n]. In these examples, x[n] may be the π/2 BPSK modulated sequence from the bit sequence b[n] described in Equation (2).

Figure 8:

FIG. 8 illustrates an example of a bit sequence table 800 in accordance with various aspects of the present disclosure. In some examples, bit sequence table 800 may implement aspects of wireless communications system 100.

Bit sequence table 800 may include a set of bit sequences 810, each of which may have a length of 18 bits. Each bit sequence 810 may correspond to a particular index value of index 805 in bit sequence table 800. In the bit sequence table 800, the index values may range from 0 to 29. The base station 105-*a* may inform the UE 115-*a* of the index value corresponding to the bit sequence to use for generation of the reference signal. An index value of "14," for example, may correspond to a bit sequence of [0 0 0 1 1 0 0 1 0 1 0 1 0 0 1 1 0 0] in bit sequence table 800.

In this example, cyclic-autocorrelation of the bit sequences 810 may satisfy Equation (4) below for delays d=−3, −2, −1, 1, 2, and 3, where L is the number of bits in the bit sequence (e.g., L=18 in this example) and indices n are interpreted as mod(L) (e.g., cyclic). For example, if n=19, 19 mod 18=1, and then x(19)=x(1). For example, the autocorrelation property may specify that, for delays d=−3, −2, −1, 1, 2, and 3, Equation (4) from above may apply.

In an example, the autocorrelation for each of the bit sequences 810 may be zero for delays d=−3, −1, 1, and 3, and a constant (e.g., a value of 2) for delays d=−2 and 2. The constant autocorrelation value at delays d=−2 and 2 may be subtracted to remove the multipath interference. To be included in bit sequence table 800, x[n] and x[n−d] are orthogonal for d=[−3, −1, 1, 3], and thus x[n−3], x[n−1], x[n+1], and x[n+3] may not contribute multipath interference to x[n], and x[n−2] and x[n+2] may contribute to multipath interference to x[n] by a constant amount that may be removed via subtraction of the constant value (e.g., by performing DC cancellation). In these examples, x[n] may be the π/2 BPSK modulated sequence from the bit sequence b[n] as described in Equation (2). Bit sequences of other bit sequence lengths may be similarly designed.

FIG. 9 illustrates an example of a bit sequence table 900 in accordance with various aspects of the present disclosure. In some examples, bit sequence table 900 may implement aspects of wireless communications system 100.

Bit sequence table 900 may include a set of bit sequences 910, each of which may have a length of 24 bits. Each bit sequence may correspond to a particular index value of index 905 in bit sequence table 900. In the bit sequence table 900, the index values may range from 0 to 29. The base station 105-*a* may inform the UE 115-*a* of the index value corresponding to the bit sequence to use for generation of the reference signal. An index value of "0," for example, may correspond to a bit sequence of [0 1 0 1 1 0 1 0 1 0 1 0 1 1 0 0 1 0 0 1 1] in bit sequence table 900.

The autocorrelation of each of the bit sequences 910 may satisfy Equation (3) above for d=−5, −4, −3, −2, −1, 1, 2, 3, 4, and 5, where L is the number of bits in the bit sequence (e.g., L=24 in this example) and indices are interpreted as mod(L) (e.g., cyclic). For example, if n=27, 27 mod 24=3, and x(27)=x(3). To be included in bit sequence table 900, x[n] and x[n−d] are orthogonal for d=[−5, −4, −3, −2, −1, 1, 2, 3, 4, 5], and thus x[n−5], x[n−4], x[n−3], x[n−2], x[n−1], x[n+1], x[n+2], x[n+3], x[n+4], x[n+5] may not contribute multipath interference to x[n]. In these examples, x[n] may be the π/2 BPSK modulated sequence generated from the bit sequence b [n] as described in Equation (2).

In some examples, bit sequences which differ by a constant phase rotation or a time-domain cyclic shift may be considered identical sequences, as they may result in large cross-correlation, and only one of which may be included in bit sequence tables 700, 800, and 900.

It is noted that the bit sequence tables 700, 800, and 900 are examples, and that other bit sequences of the respective lengths that satisfy the autocorrelation property described herein may be used instead of or in addition to the listed bit sequences. Moreover, the techniques described herein may be used to generate bit sequences of other bit sequence lengths. In some cases, the bit sequence tables 700, 800, and 900 may be examples of bit sequences generated based on Equation (2). Moreover, the techniques described herein may be used to generate bit sequences of other bit sequence lengths. In some cases, bit sequences used to generate π/2 BPSK sequences by Equation (2) may be similar to bit sequences used to generate π/2 BPSK sequences by Equation (1), but these bit sequences may have flipped bit at indexes 2, 3, 6, 7, 10, 11, 14, 15, 18, 19, 22, and 23 (e.g., starting with an index of 0).

Figure 10:
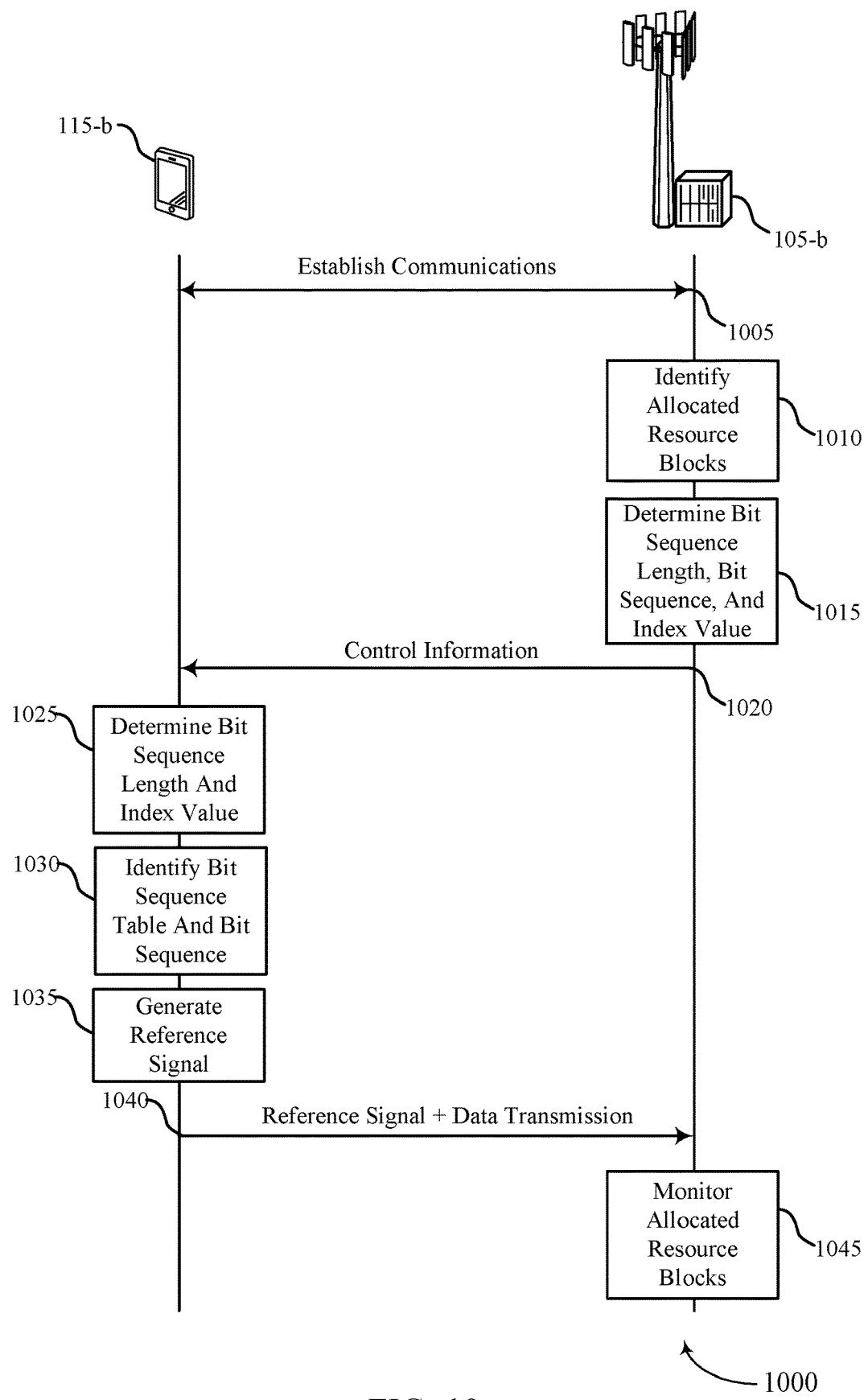
FIGS. 10 and 11 illustrate examples of process flows in accordance with aspects of the present disclosure.

FIG. 10 illustrates an example of a process flow 1000 in accordance with various aspects of the present disclosure. In some examples, process flow 1000 may implement aspects of wireless communications system 100. Process flow 1000 may include UE 115-*b* and base station 105-*b*, which may be respective examples of a UE 115 and a base station 105 as described herein. Process flow 1000 may implement techniques for generating an uplink reference signal using π/2 BPSK modulation.

At 1005, UE 115-*b* and base station 105-*b* may establish communications. In some cases, during connection establishment (e.g., RRC connection establishment or RRC connection reconfiguration), base station 105-*b* may semi-statically configure UE 115-*b* with an index value for at least one of the bit sequence tables (see FIGS. 4-6). The index value may be the same for each bit sequence table, or may differ for each of the bit sequence tables.

At 1010, base station 105-*b* may identify a set of resource blocks allocated for an uplink data transmission and a number of the allocated resource blocks. For example, the base station 105-*b* may select a set of resource blocks to allocate to the UE 115-*b* for the uplink data transmission and the number of allocated resource blocks.

At 1015, base station 105-*b* may determine a bit sequence length corresponding to the number of allocated resource blocks, and identify a bit sequence table from the set of bit sequence tables based on the determined bit sequence length. The base station 105-*b* may also select a bit sequence from a set of bit sequences in the identified bit sequence table, and identify an index value corresponding to the selected bit sequence in the bit sequence table. In an example, the base station 105-*b* may select a bit sequence from a bit sequence table that it is not currently using for communication with a different UE.

At 1020, base station 105-*b* may transmit control information to UE 115-*b* indicating the number of allocated resource blocks. In an example, the control information may include a grant allocating a set of resource blocks to the UE 115-b for transmitting a reference signal and an uplink data transmission to the base station 105-b. In some cases, the control information may include the index value for the identified bit sequence table to indicate which bit sequence of the set of bit sequences to use from the bit sequence table. In some cases, base station 105-b may signal the bit sequence length to UE 115-b (e.g., in the grant or other DCI), or UE 115-b may determine the bit sequence length based on the number of allocated resource blocks (e.g., a bit sequence length is a function of the number of allocated resource blocks).

At 1025, UE 115-b may determine the bit sequence length and the index value based at least in part on the control information. In an example, the UE 115-b may process the control information to identify the set of allocated resource blocks and the number of allocated resource blocks. UE 115-b may determine the bit sequence length corresponding to the number of allocated resource blocks. In some examples, the UE 115-b may process the control information to identify the index value. In some examples, the base station 105-b may semi-statically configure the UE 115-b with the index value.

At 1030, UE 115-b may identify a bit sequence table from a set of bit sequence tables based on the bit sequence length and use the index value to identify a bit sequence from the identified bit sequence table. For example, the UE 115-b may determine that a bit sequence length corresponding to the allocated resource blocks has a length of 12 bits and may use the index value to retrieve a bit sequence from bit sequence table 400 that includes the set of 12 bit sequences.

At 1035, UE 115-b may generate a reference signal based on the selected bit sequence having the bit sequence length. For example, UE 115-b may use the transmit chain 300 illustrated in FIG. 3 to modulate the bit sequence to generate the reference signal. The UE 115-b may use the same transmit chain 300 to modulate a data bit sequence to generate the uplink data transmission for transmission within the allocated resource blocks.

At 1040, UE 115-b may transmit the reference signal and the uplink data transmission to base station 105-b within the allocated resource blocks. The reference signal may be, for example a DMRS. In some cases, a PAPR of tones of the uplink data transmission transporting the modulated data bit sequence within the allocated resource blocks may satisfy a PAPR threshold and a PAPR of tones transporting the reference signal within the allocated blocks may satisfy the PAPR threshold. Therefore, the reference signal and data may use a same modulation scheme resulting in a low PAPR for both the reference signal and the uplink data transmission.

At 1045, base station 105-b may monitor the allocated resource blocks for the reference signal and the uplink data transmission. Base station 105-b may receive the reference signal within the allocated resource blocks for estimating amplitude and/or phase distortion introduced to the uplink data transmission by the wireless channel. Base station 105-b may then remove the amplitude and/or phase distortion during decoding of the uplink data transmission. In some cases, the wireless channel may introduce delay to the reference signal, and each bit sequence used to generate the reference signal may be orthogonal to at least one delayed version of itself to distinguish multipath interference.

Figure 11:
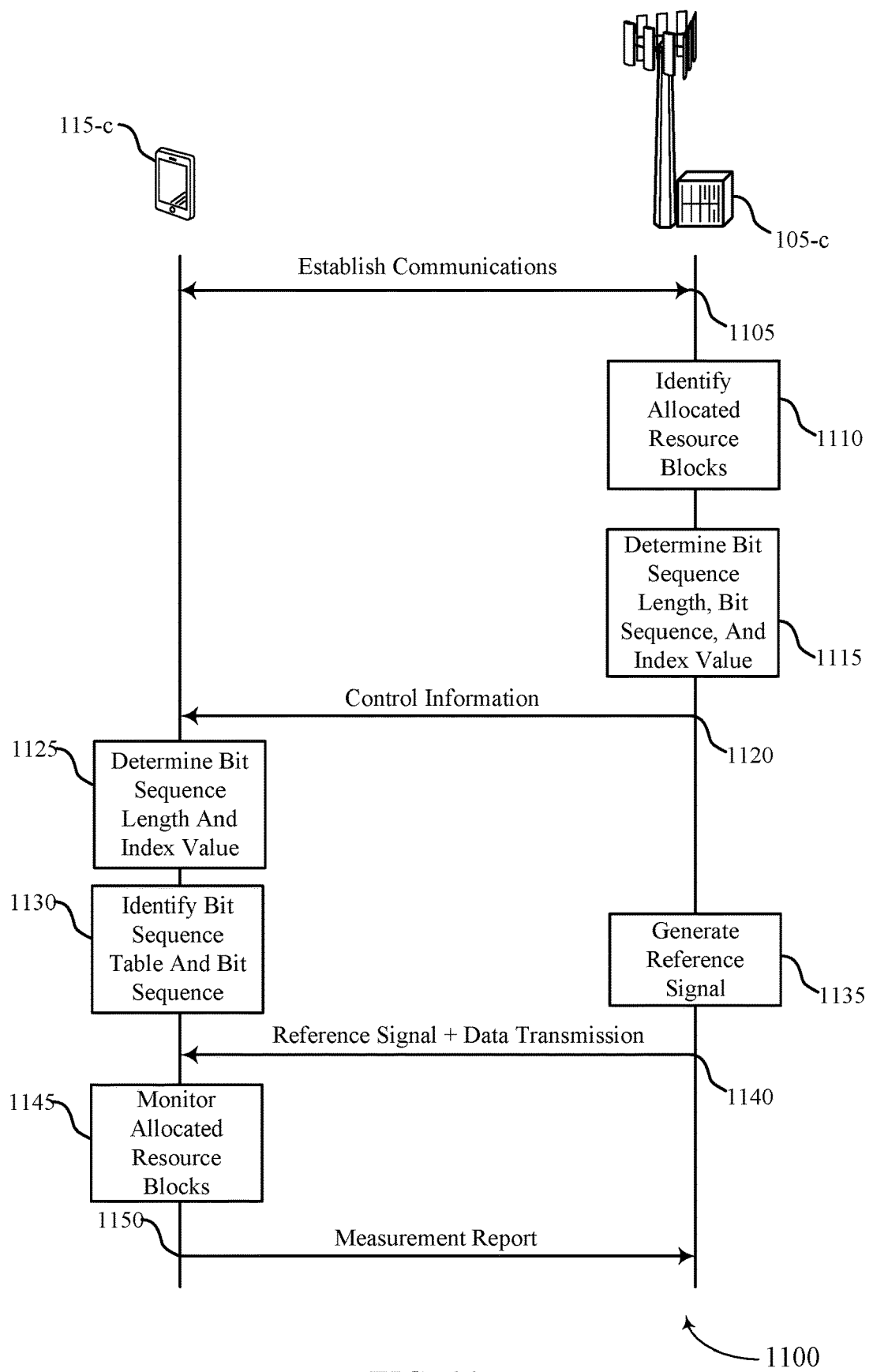

FIG. 11 illustrates an example of a process flow 1100 in accordance with various aspects of the present disclosure. In some examples, process flow 1100 may implement aspects of wireless communications system 100. Process flow 1100 may include UE 115-c and base station 105-c, which may be respective examples of a UE 115 and a base station 105 as described herein. Process flow 1100 may implement techniques for generating a downlink reference signal using $\pi/2$ BPSK modulation.

At 1105, UE 115-c and base station 105-c may establish communications. In some cases, during connection establishment (e.g., RRC connection establishment or RRC connection reconfiguration), base station 105-c may semi-statically configure UE 115-c with an index value for at least one of the bit sequence tables (see FIGS. 4-6). The index value may be the same for each bit sequence table or may differ for up to each of the bit sequence tables.

At 1110, base station 105-c may identify a set of resource blocks and a number of the allocated resource blocks. For example, the base station 105-c may select a set of resource blocks to allocate to the UE 115-c for a downlink transmission and determine the number of allocated resource blocks.

At 1115, base station 105-c may determine a bit sequence length corresponding to the number of allocated resource blocks, and identify a bit sequence table from a set of bit sequence tables based on the determined bit sequence length. The base station 105-c may also select a bit sequence from a set of bit sequences in the identified bit sequence table, and identify an index value corresponding to the selected bit sequence in the bit sequence table. In an example, the base station 105-c may select a bit sequence that it is not currently using for communication with a different UE.

At 1120, base station 105-c may transmit control information to UE 115-c indicating the number of allocated resource blocks. In an example, the control information may include a grant allocating a set of resource blocks to the UE 115-c for receiving a reference signal and a downlink data transmission from the base station 105-c. In some cases, the control information may include an index value to the bit sequence table to identify the bit sequence from the set of bit sequences included in the bit sequence table. In some cases, base station 105-c may signal the bit sequence length to UE 115-c (e.g., in the grant or other DCI), or UE 115-c may determine the bit sequence length based on the number of allocated resource blocks (e.g., a bit sequence length is a function of the number of allocated resource blocks).

At 1125, UE 115-c may determine the bit sequence length and the index value based at least in part on the control information. In an example, the UE 115-c may process the control information to identify the set of allocated resource blocks and the number of allocated resource blocks. UE 115-c may determine the bit sequence length corresponding to the number of allocated resource blocks. In some examples, the UE 115-c may process the control information to identify the index value. In some examples, the base station 105-c may semi-statically configure the UE 115-c with the index value.

At 1130, UE 115-c may identify a bit sequence table from a set of bit sequence tables based on the bit sequence length and use the index value to identify a bit sequence from the identified bit sequence table. For example, the UE 115-c may determine that a bit sequence length corresponding to the allocated resource blocks has a length of 18 bits, and may use the index value to retrieve a bit sequence from bit sequence table 500 that includes the set of 18 bit sequences.

At 1135, base station 105-c may generate a reference signal based on the selected bit sequence having the bit sequence length. For example, base station 105-c may use the transmit chain 300 illustrated in FIG. 3 to modulate the bit sequence to generate the reference signal. The base station 105-*c* may use the same transmit chain 300 to modulate a data bit sequence to generate the downlink data transmission for transmission within the allocated resource blocks.

At 1140, base station 105-*c* may transmit the reference signal and the downlink data transmission to UE 115-*c* within the allocated resource blocks. The reference signal may be, for example a cell-specific reference signal. In some cases, a PAPR of tones of the downlink data transmission transporting the modulated data bit sequence within the allocated resource blocks may satisfy a PAPR threshold and a PAPR of tones transporting the reference signal within the allocated blocks may satisfy the PAPR threshold. Therefore, the reference signal and data may use a same modulation scheme resulting in a low PAPR for both the reference signal and data.

At 1145, UE 115-*c* may monitor the allocated resource blocks for the reference signal and the downlink data transmission. UE 115-*c* may receive the reference signal within the allocated resource blocks for estimating amplitude and/or phase distortion introduced to the downlink data transmission by the wireless channel. UE 115-*c* may then remove the amplitude and/or phase distortion during decoding of the downlink data transmission. In some cases, the wireless channel may introduce delay to the reference signal, and each bit sequence used to generate the reference signal may be orthogonal to at least one delay version of itself to distinguish multipath interference.

In some cases, at 1150, UE 115-*c* may transmit a measurement report to base station 105-*c* including the channel estimate determined from the reference signal. The base station 105-*c* may use the measurement report as part of a handover determination for the UE 115-*c*, for adjusting a transmission power level for transmissions to the UE 115-*c*, or the like.

Figure 12:
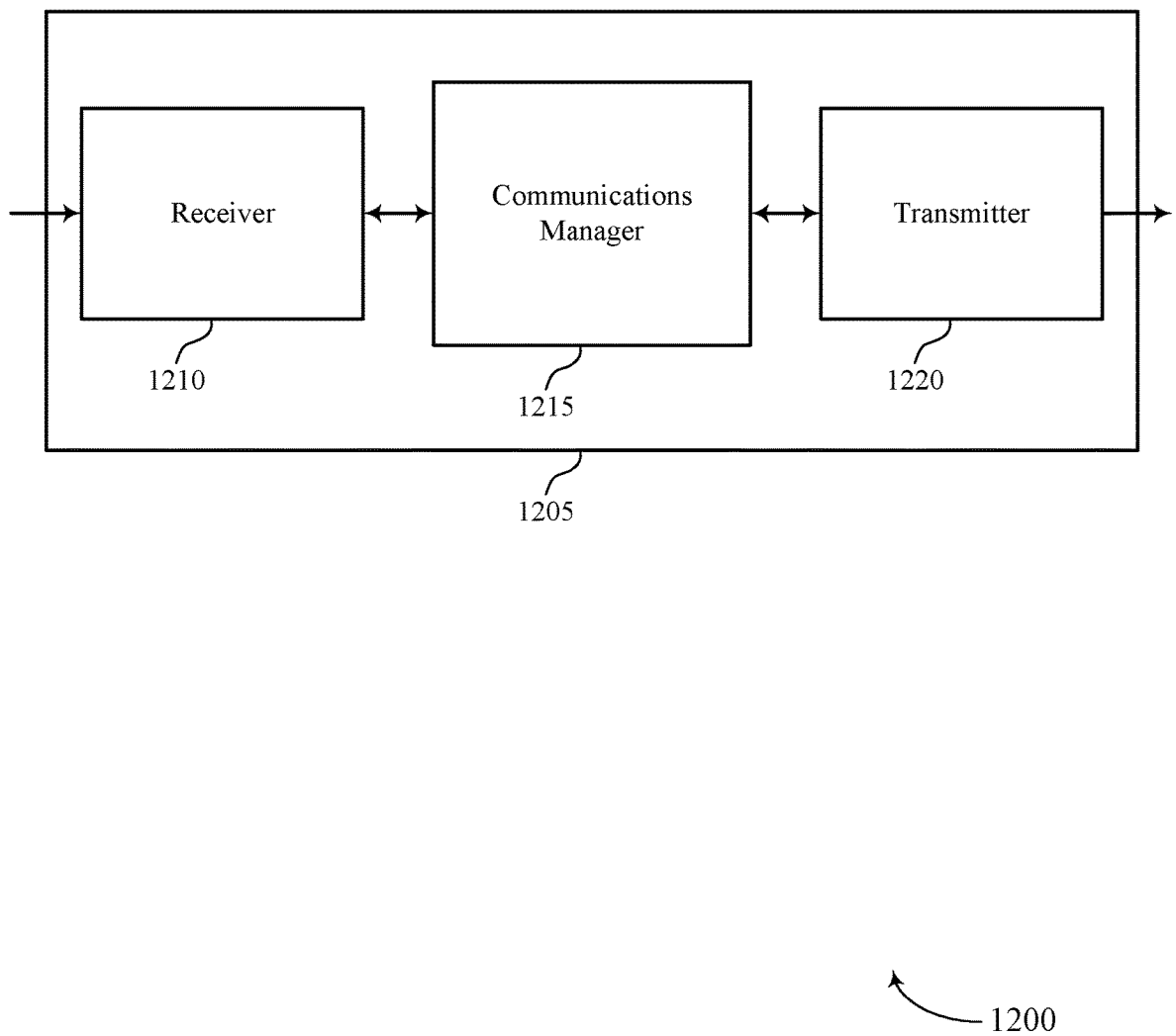
FIGS. 12 through 14 show block diagrams of a device that supports reference signal sequence design for new radio systems in accordance with aspects of the present disclosure.

FIG. 12 shows a block diagram 1200 of a wireless device 1205 in accordance with aspects of the present disclosure. Wireless device 1205 may be an example of aspects of a UE 115 or base station 105 as described herein. Wireless device 1205 may include receiver 1210, communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to reference signal sequence design for new radio systems, etc.). Information may be passed on to other components of the device. The receiver 1210 may be an example of aspects of the transceiver 1235 described with reference to FIG. 12. The receiver 1210 may utilize a single antenna or a set of antennas.

Communications manager 1215 may be an example of aspects of the communications manager 1215 described with reference to FIG. 12.

Communications manager 1215 and/or at least some of its various sub-components may be implemented in hardware, software executed by a processor, firmware, or any combination thereof. If implemented in software executed by a processor, the functions of the communications manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1215 and/or at least some of its various sub-components may be physically located at various positions, including being distributed such that portions of functions are implemented at different physical locations by one or more physical devices. In some examples, communications manager 1215 and/or at least some of its various sub-components may be a separate and distinct component in accordance with various aspects of the present disclosure. In other examples, communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1215 may identify a set of allocated resource blocks and a number of the allocated resource blocks, determine a bit sequence length corresponding to the number of allocated resource blocks, generate a reference signal based on a bit sequence having the bit sequence length, and transmit the reference signal within the allocated resource blocks. The communications manager 1215 may also identify a set of allocated resource blocks and a number of the allocated resource blocks, determine a bit sequence length corresponding to the number of allocated resource blocks, and monitor the allocated resource blocks for a reference signal that is generated based on a bit sequence having the bit sequence length.

In some cases, the communications manager 1215 may identify a set of allocated resource blocks and a number of the allocated resource blocks, determine a bit sequence length corresponding to the number of allocated resource blocks, select a bit sequence from a bit sequence table including a set of bit sequences having the bit sequence length, modulate the bit sequence using a $\pi/2$ binary phase shift keying modulation scheme, generate a reference signal based on the modulated bit sequence, and transmit the reference signal within the allocated resource blocks.

In some cases, the communications manager 1215 may identify a set of allocated resource blocks and a number of the allocated resource blocks, determine a bit sequence length corresponding to the number of allocated resource blocks, select a bit sequence from a bit sequence table including a set of bit sequences having the bit sequence length, monitor the allocated resource blocks for a reference signal that is generated based on modulating the bit sequence with a $\pi/2$ binary phase shift keying modulation scheme, receive the reference signal within the allocated resource blocks based on the monitoring, and determine a channel estimate based on the reference signal.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1235 described with reference to FIG. 12. The transmitter 1220 may utilize a single antenna or a set of antennas.

Figure 13:
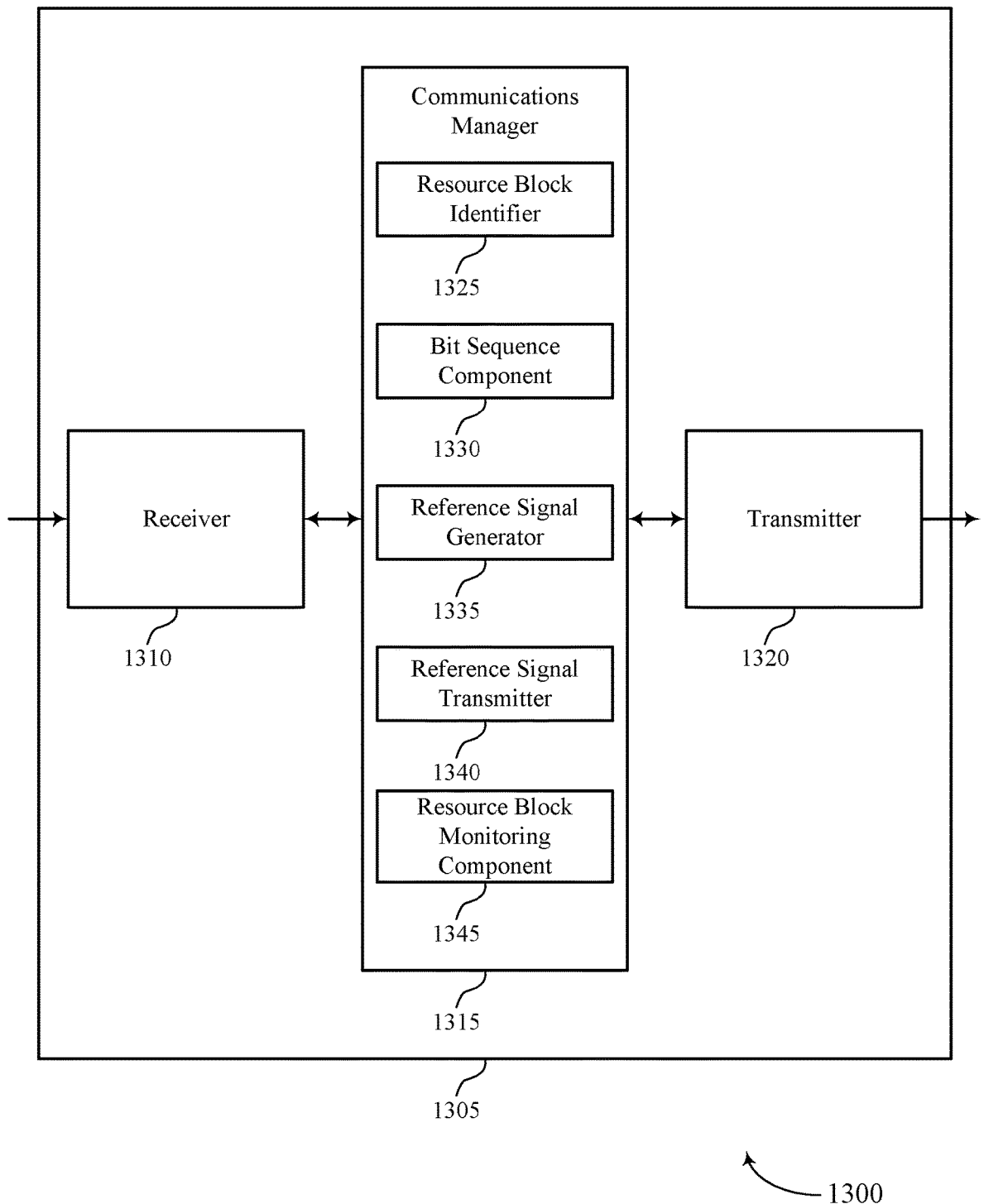

FIG. 13 shows a block diagram 1300 of a wireless device 1305 in accordance with aspects of the present disclosure. Wireless device 1305 may be an example of aspects of a wireless device 1205 or a UE 115 or base station 105 as described with reference to FIG. 12. Wireless device 1305 may include receiver 1310, communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to reference signal sequence design for new radio systems, etc.). Information may be passed on to other components of the device. The receiver 1310 may be an example of aspects of the transceiver 1235 described with reference to FIG. 12. The receiver 1310 may utilize a single antenna or a set of antennas.

Communications manager 1315 may be an example of aspects of the communications manager 1215 described with reference to FIG. 12. Communications manager 1315 may also include resource block identifier 1325, bit sequence component 1330, reference signal generator 1335, reference signal transmitter 1340, and resource block monitoring component 1345.

Resource block identifier 1325 may identify a set of allocated resource blocks and a number of the allocated resource blocks and transmit control information indicating the number of allocated resource blocks. In some cases, identifying the number of allocated resource blocks includes determining that the number of allocated resource blocks satisfies a threshold. In some cases, identifying the number of allocated resource blocks includes determining that the number of allocated resource blocks satisfies a threshold.

Bit sequence component 1330 may determine a bit sequence length corresponding to the number of allocated resource blocks, receive control information indicating an index to a table to identify the bit sequence from a set of bit sequences included in the table, identify a bit sequence table from a set of bit sequence tables based on the bit sequence length, select the bit sequence from a set of bit sequences included in the bit sequence table, and transmit control information indicating an index to a table to identify the bit sequence from a set of bit sequences included in the table. In some cases, each bit sequence of the set of bit sequences included in the bit sequence table satisfies a cyclic autocorrelation threshold, or a frequency domain fluctuation threshold, or a cyclic cross-correlation threshold, or a PAPR threshold, or any combination thereof. In some cases, each of the set of bit sequence tables corresponds to a different bit sequence length.

In some cases, the bit sequence length is 12 bits, or 18 bits, or 24 bits. In some cases, the bit sequence is orthogonal to at least one cyclically shifted version of the bit sequence. In some cases, each of the set of bit sequence tables corresponds to a different bit sequence length. In some cases, each bit sequence of the set of bit sequences included in the bit sequence table satisfies a cyclic autocorrelation threshold, or a frequency domain fluctuation threshold, or a cyclic cross-correlation threshold, or a PAPR threshold, or any combination thereof. In some cases, the bit sequence length is 12 bits, or 18 bits, or 24 bits. In some cases, determining the bit sequence length includes determining the bit sequence length based on the number of allocated resource blocks. In some cases, identifying the number of allocated resource blocks includes receiving control information indicating the number of allocated resource blocks. In some cases, the bit sequence is orthogonal to at least one cyclically shifted version of the bit sequence.

Reference signal generator 1335 may generate a reference signal based on a bit sequence having the bit sequence length. Reference signal transmitter 1340 may transmit the reference signal within the allocated resource blocks. Resource block monitoring component 1345 may monitor the allocated resource blocks for a reference signal that is generated based on a bit sequence having the bit sequence length.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1235 described with reference to FIG. 12. The transmitter 1320 may utilize a single antenna or a set of antennas.

Figure 14:
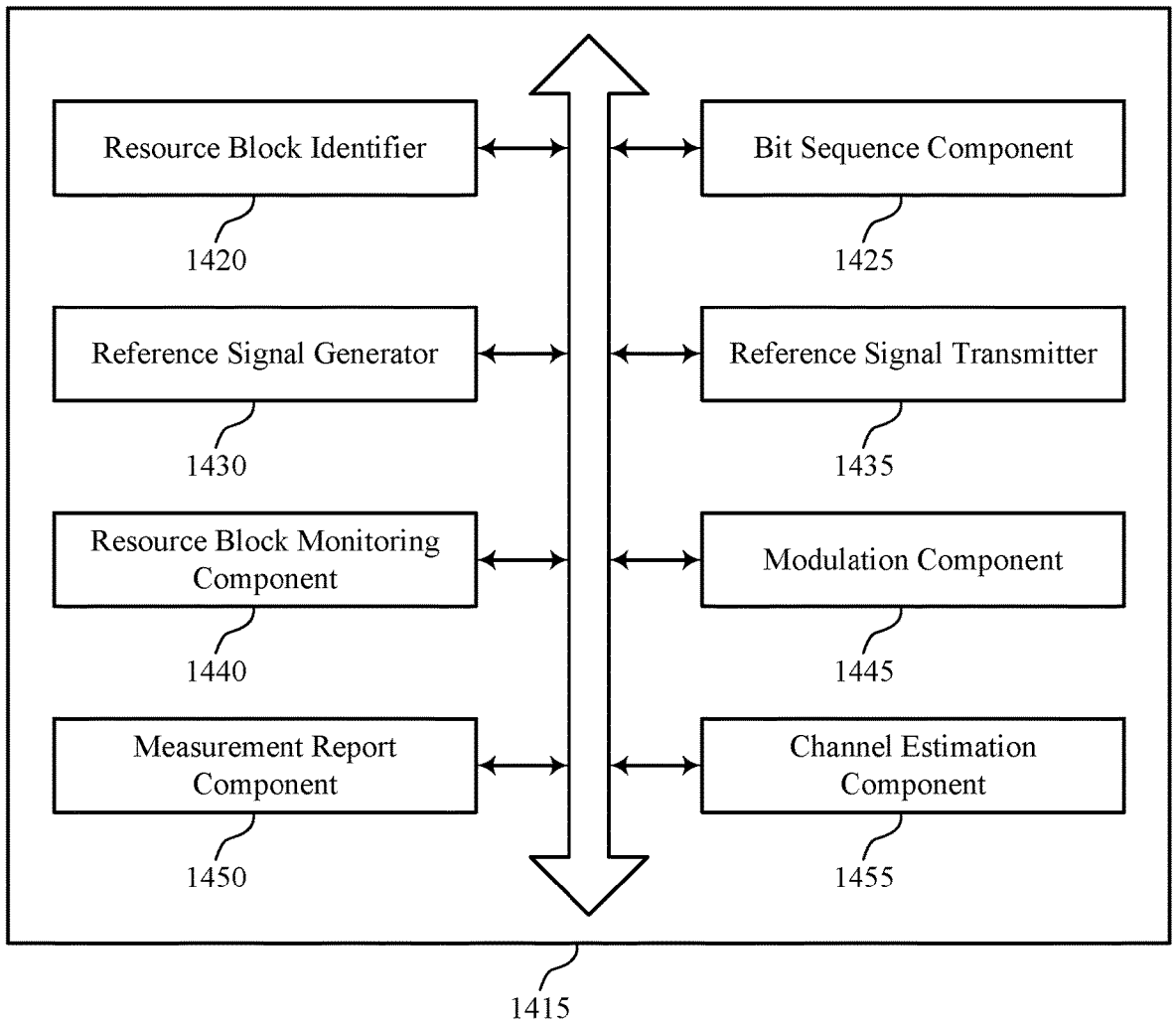

FIG. 14 shows a block diagram 1400 of a communications manager 1415 in accordance with aspects of the present disclosure. The communications manager 1415 may be an example of aspects of a communications manager 1215, a communications manager 1315, or a communications manager 1215 described with reference to FIGS. 12, 13, and 12. The communications manager 1415 may include resource block identifier 1420, bit sequence component 1425, reference signal generator 1430, reference signal transmitter 1435, resource block monitoring component 1440, modulation component 1445, measurement report component 1450, and channel estimation component 1455. Each of these modules may communicate, directly or indirectly, with one another (e.g., via one or more buses).

Resource block identifier 1420 may identify a set of allocated resource blocks and a number of the allocated resource blocks and transmit control information indicating the number of allocated resource blocks. In some cases, identifying the number of allocated resource blocks includes determining that the number of allocated resource blocks satisfies a threshold. In some cases, identifying the number of allocated resource blocks includes determining that the number of allocated resource blocks satisfies a threshold.

Bit sequence component 1425 may determine a bit sequence length corresponding to the number of allocated resource blocks, receive control information indicating an index to a table to identify the bit sequence from a set of bit sequences included in the table, identify a bit sequence table from a set of bit sequence tables based on the bit sequence length, select the bit sequence from a set of bit sequences included in the bit sequence table, and transmit control information indicating an index to a table to identify the bit sequence from a set of bit sequences included in the table. In some cases, each bit sequence of the set of bit sequences included in the bit sequence table satisfies a cyclic autocorrelation threshold, or a frequency domain fluctuation threshold, or a cyclic cross-correlation threshold, or a PAPR threshold, or any combination thereof. In some cases, each of the set of bit sequence tables corresponds to a different bit sequence length.

In some cases, the bit sequence length is 12 bits, or 18 bits, or 24 bits. In some cases, the bit sequence table may include the set of bit sequences of the bit sequence length of 12 bits, or 18 bits, or 24 bits. In some cases, the bit sequence is orthogonal to at least one cyclically shifted version of the bit sequence. In some cases, each of the set of bit sequence tables corresponds to a different bit sequence length. In some cases, each bit sequence of the set of bit sequences included in the bit sequence table satisfies a cyclic autocorrelation threshold, or a frequency domain fluctuation threshold, or a cyclic cross-correlation threshold, or a PAPR threshold, or any combination thereof. In some cases, the bit sequence length is 12 bits, or 18 bits, or 24 bits. In some cases, determining the bit sequence length includes determining the bit sequence length based on the number of allocated resource blocks. In some cases, identifying the number of allocated resource blocks includes receiving control information indicating the number of allocated resource blocks. In some cases, the bit sequence is orthogonal to at least one cyclically shifted version of the bit sequence. In some cases, the modulated bit sequence is orthogonal to at least one cyclically shifted version of the modulated bit sequence. Reference signal generator 1430 may generate a reference signal based on a bit sequence having the bit sequence length. Reference signal transmitter 1435 may transmit the reference signal within the allocated resource blocks. Resource block monitoring component 1440 may monitor the allocated resource blocks for a reference signal that is generated based on a bit sequence having the bit sequence length. In some cases, the resource block monitoring component 1440 may monitor the allocated resource blocks for a reference signal that is generated based on modulating the bit sequence with a π/2 binary phase shift keying modulation scheme. In some cases, the resource block monitoring component 1440 may receive the reference signal within the allocated resource blocks based on the monitoring Modulation component 1445 may modulate a data bit sequence using the modulation scheme to generate a modulated data bit sequence, transmit the modulated data bit sequence within the allocated resource blocks, where a PAPR of tones transporting the modulated data bit sequence within the allocated resource blocks satisfies a PAPR threshold and a PAPR of tones transporting the reference signal within the allocated resource blocks satisfies the PAPR threshold, and receive the reference signal and a modulated data bit sequence within the allocated resource blocks, where a PAPR of tones transporting the modulated data bit sequence within the allocated resource blocks satisfies a PAPR threshold and a PAPR of tones transporting the reference signal within the allocated resource blocks satisfies the PAPR threshold. In some cases, the modulation component 1445 may configure a transmitter to transmit the modulated data bit sequence within the allocated resource blocks. In some cases, the modulation component 1445 may configure a receiver to receive the reference signal and a modulated data bit sequence within the allocated resource blocks.

In some cases, generating the reference signal includes modulating the bit sequence using a modulation scheme to generate the reference signal. In some cases, the modulation scheme is a π/2 binary phase shift keying modulation scheme. In some cases, the reference signal is generated based on modulating the bit sequence using a modulation scheme. In some cases, the modulation scheme is a π/2 binary phase shift keying modulation scheme.

Measurement report component 1450 may receive a measurement report that includes a channel estimate determined based on the reference signal. Channel estimation component 1455 may determine a channel estimate based on the reference signal and decode the modulated data bit sequence from the allocated resource blocks based on the channel estimate.

Figure 15:
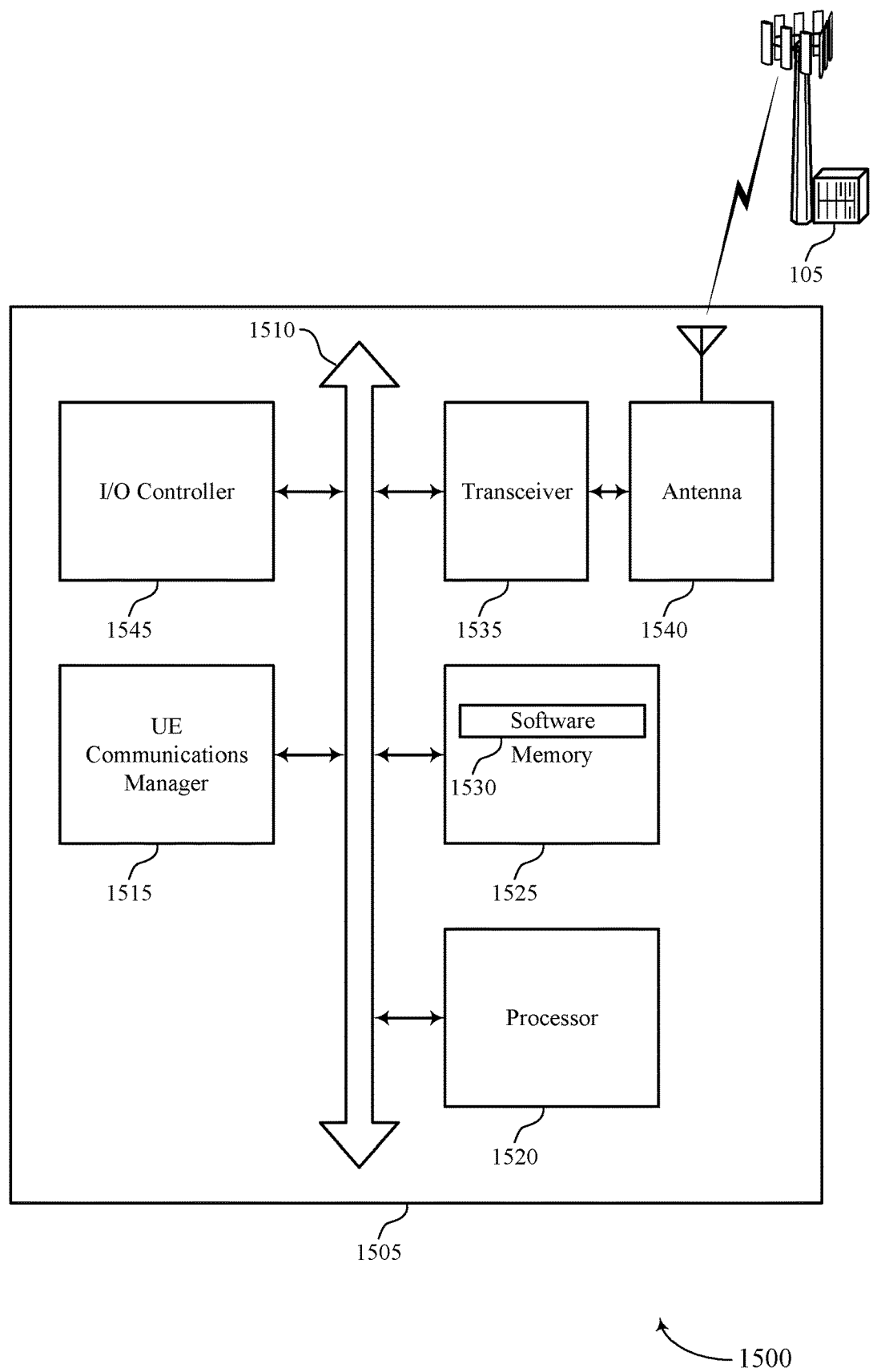
FIG. 15 illustrates a block diagram of a system including a UE in accordance with aspects of the present disclosure.

FIG. 15 shows a diagram of a system 1500 including a device 1505 in accordance with aspects of the present disclosure. Device 1505 may be an example of or include the components of wireless device 1205, wireless device 1305, or a UE 115 as described above, e.g., with reference to FIGS. 12 and 13. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting reference signal sequence design for new radio systems).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

Software 1530 may include code to implement aspects of the present disclosure, including code to support reference signal sequence design for new radio systems. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
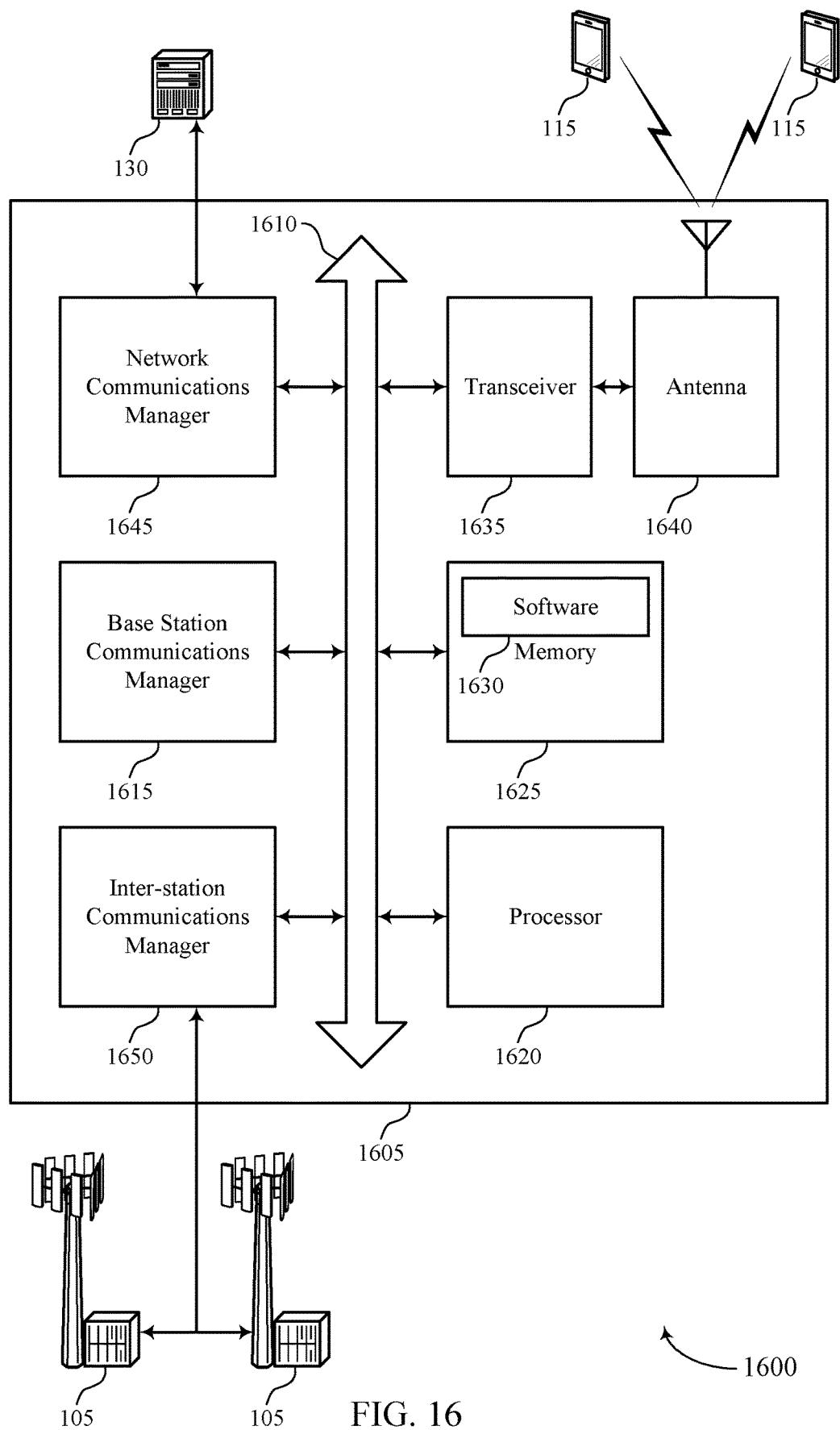
FIG. 16 illustrates a block diagram of a system including a base station in accordance with aspects of the present disclosure.

FIG. 16 shows a diagram of a system 1600 including a device 1605 in accordance with aspects of the present disclosure. Device 1605 may be an example of or include the components of wireless device 1305, wireless device 1405, or a base station 105 as described above, e.g., with reference to FIGS. 13 and 14. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting reference signal sequence design for new radio systems).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support reference signal sequence design for new radio systems. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
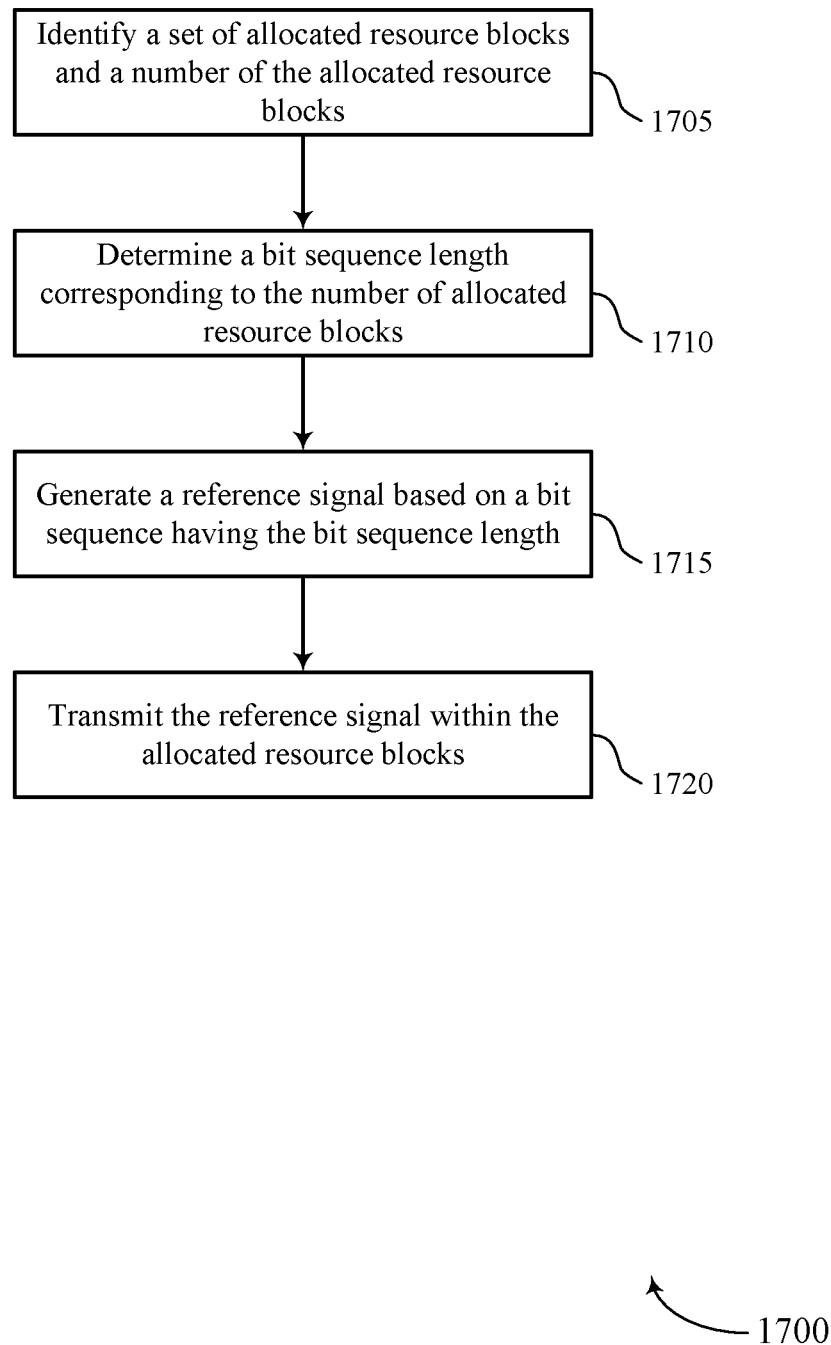
FIGS. 17 through 22 illustrate methods for reference signal sequence design for new radio systems in accordance with aspects of the present disclosure.

FIG. 17 shows a flowchart illustrating a method 1700 in accordance with aspects of the present disclosure. The operations of method 1700 may be implemented by a UE 115 or base station 105 or its components as described herein. For example, the operations of method 1700 may be performed by a communications manager as described with reference to FIGS. 12 through 14. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1705 the UE 115 or base station 105 may identify a plurality of allocated resource blocks and a number of the allocated resource blocks. The operations of 1705 may be performed according to the methods described herein. In certain examples, aspects of the operations of 1705 may be performed by a resource block identifier as described with reference to FIGS. 12 through 14.

At 1710 the UE 115 or base station 105 may determine a bit sequence length corresponding to the number of allocated resource blocks. The operations of 1710 may be performed according to the methods described herein. In certain examples, aspects of the operations of 1710 may be performed by a bit sequence component as described with reference to FIGS. 12 through 14.

At 1715 the UE 115 or base station 105 may generate a reference signal based at least in part on a bit sequence having the bit sequence length. The operations of 1715 may be performed according to the methods described herein. In certain examples, aspects of the operations of 1715 may be performed by a reference signal generator as described with reference to FIGS. 12 through 14.

At 1720 the UE 115 or base station 105 may transmit the reference signal within the allocated resource blocks. The operations of 1720 may be performed according to the methods described herein. In certain examples, aspects of the operations of 1720 may be performed by a reference signal transmitter as described with reference to FIGS. 12 through 14.

Figure 18:
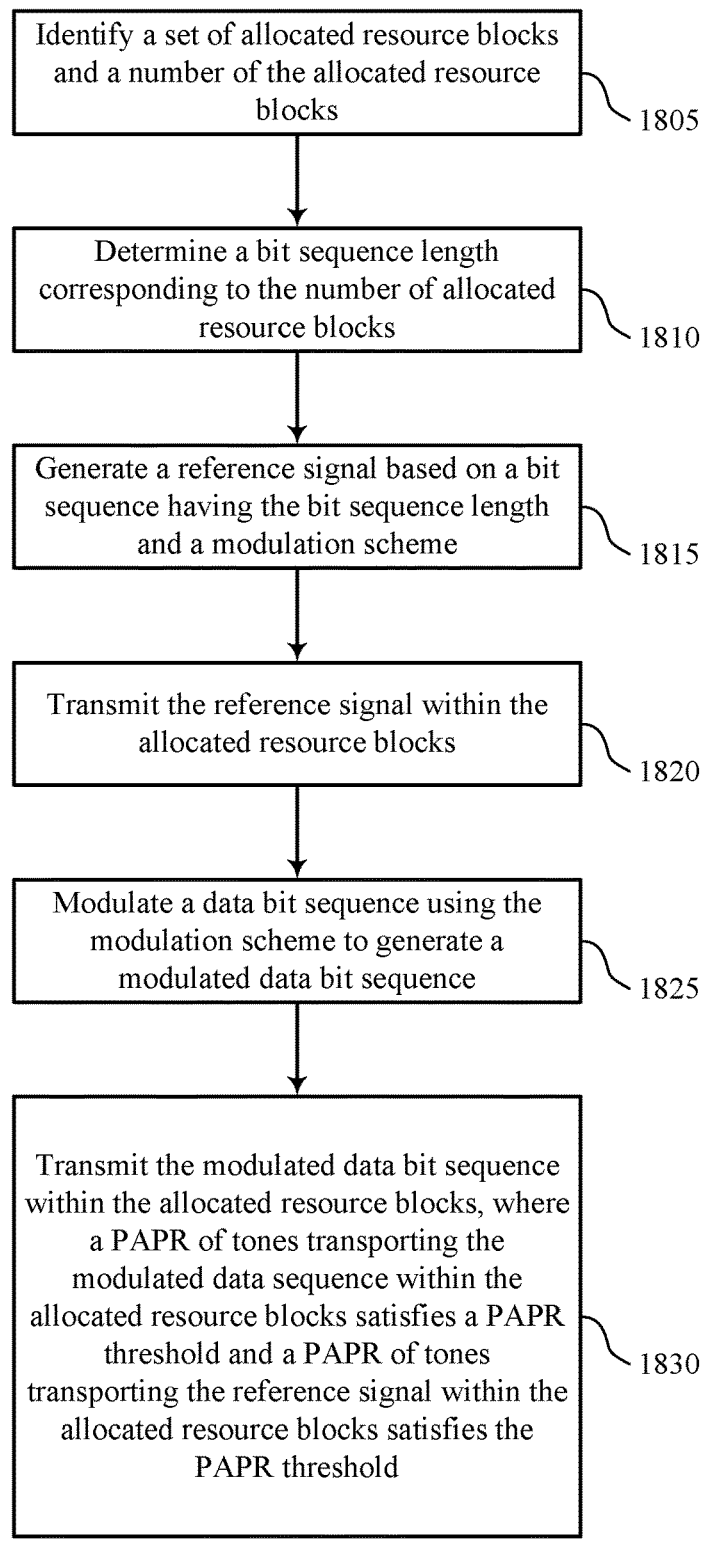

FIG. 18 shows a flowchart illustrating a method 1800 in accordance with aspects of the present disclosure. The operations of method 1800 may be implemented by a UE 115 or base station 105 or its components as described herein. For example, the operations of method 1800 may be performed by a communications manager as described with reference to FIGS. 12 through 14. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1805 the UE 115 or base station 105 may identify a plurality of allocated resource blocks and a number of the allocated resource blocks. The operations of 1805 may be performed according to the methods described herein. In certain examples, aspects of the operations of 1805 may be performed by a resource block identifier as described with reference to FIGS. 12 through 14.

At 1810 the UE 115 or base station 105 may determine a bit sequence length corresponding to the number of allocated resource blocks. The operations of 1810 may be performed according to the methods described herein. In certain examples, aspects of the operations of 1810 may be performed by a bit sequence component as described with reference to FIGS. 12 through 14.

At 1815 the UE 115 or base station 105 may generate a reference signal based at least in part on a bit sequence having the bit sequence length and a modulation scheme. The operations of 1815 may be performed according to the methods described herein. In certain examples, aspects of the operations of 1815 may be performed by a reference signal generator as described with reference to FIGS. 12 through 14.

At 1820 the UE 115 or base station 105 may transmit the reference signal within the allocated resource blocks. The operations of 1820 may be performed according to the methods described herein. In certain examples, aspects of the operations of 1820 may be performed by a reference signal transmitter as described with reference to FIGS. 12 through 14.

At 1825 the UE 115 or base station 105 may modulate a data bit sequence using the modulation scheme to generate a modulated data bit sequence. The operations of 1825 may be performed according to the methods described herein. In certain examples, aspects of the operations of 1825 may be performed by a modulation component as described with reference to FIGS. 12 through 14.

At 1830 the UE 115 or base station 105 may transmit the modulated data bit sequence within the allocated resource blocks, wherein a PAPR of tones transporting the modulated data bit sequence within the allocated resource blocks satisfies a PAPR threshold and a PAPR of tones transporting the reference signal within the allocated resource blocks satisfies the PAPR threshold. The operations of 1830 may be performed according to the methods described herein. In certain examples, aspects of the operations of 1830 may be performed by a modulation component as described with reference to FIGS. 12 through 14.

Figure 19:
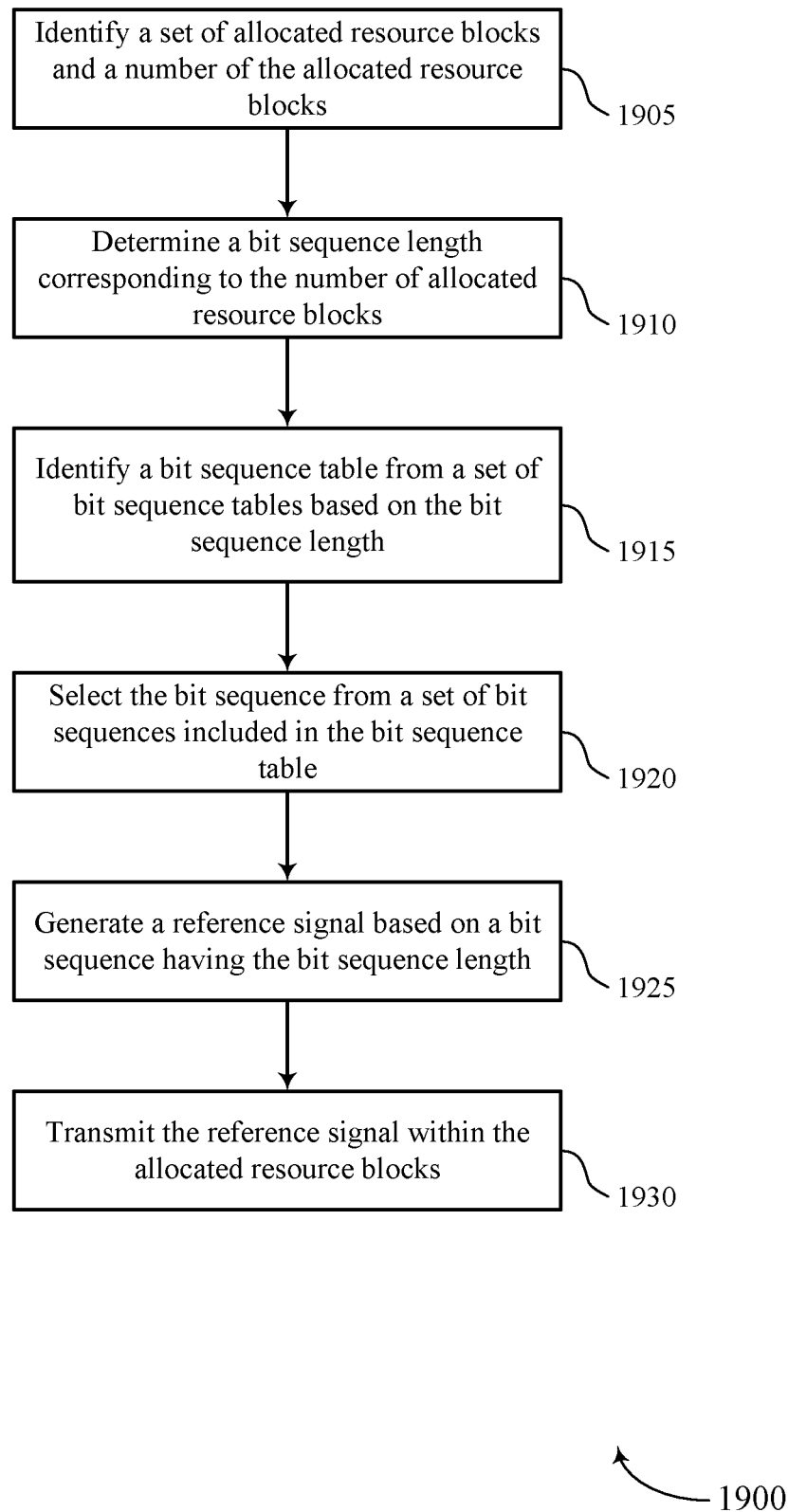

FIG. 19 shows a flowchart illustrating a method 1900 in accordance with aspects of the present disclosure. The operations of method 1900 may be implemented by a UE 115 or base station 105 or its components as described herein. For example, the operations of method 1900 may be performed by a communications manager as described with reference to FIGS. 12 through 14. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1905 the UE 115 or base station 105 may identify a plurality of allocated resource blocks and a number of the allocated resource blocks. The operations of 1905 may be performed according to the methods described herein. In certain examples, aspects of the operations of 1905 may be performed by a resource block identifier as described with reference to FIGS. 12 through 14.

At 1910 the UE 115 or base station 105 may determine a bit sequence length corresponding to the number of allocated resource blocks. The operations of 1910 may be performed according to the methods described herein. In certain examples, aspects of the operations of 1910 may be performed by a bit sequence component as described with reference to FIGS. 12 through 14.

At 1915 the UE 115 or base station 105 may identify a bit sequence table from a plurality of bit sequence tables based at least in part on the bit sequence length. The operations of 1915 may be performed according to the methods described herein. In certain examples, aspects of the operations of 1915 may be performed by a bit sequence component as described with reference to FIGS. 12 through 14.

At 1920 the UE 115 or base station 105 may select the bit sequence from a plurality of bit sequences included in the bit sequence table. The operations of 1920 may be performed according to the methods described herein. In certain examples, aspects of the operations of 1920 may be performed by a bit sequence component as described with reference to FIGS. 12 through 14.

At 1925 the UE 115 or base station 105 may generate a reference signal based at least in part on a bit sequence having the bit sequence length. The operations of 1925 may be performed according to the methods described herein. In certain examples, aspects of the operations of 1925 may be performed by a reference signal generator as described with reference to FIGS. 12 through 14.

At 1930 the UE 115 or base station 105 may transmit the reference signal within the allocated resource blocks. The operations of 1930 may be performed according to the methods described herein. In certain examples, aspects of the operations of 1930 may be performed by a reference signal transmitter as described with reference to FIGS. 12 through 14.

Figure 20:
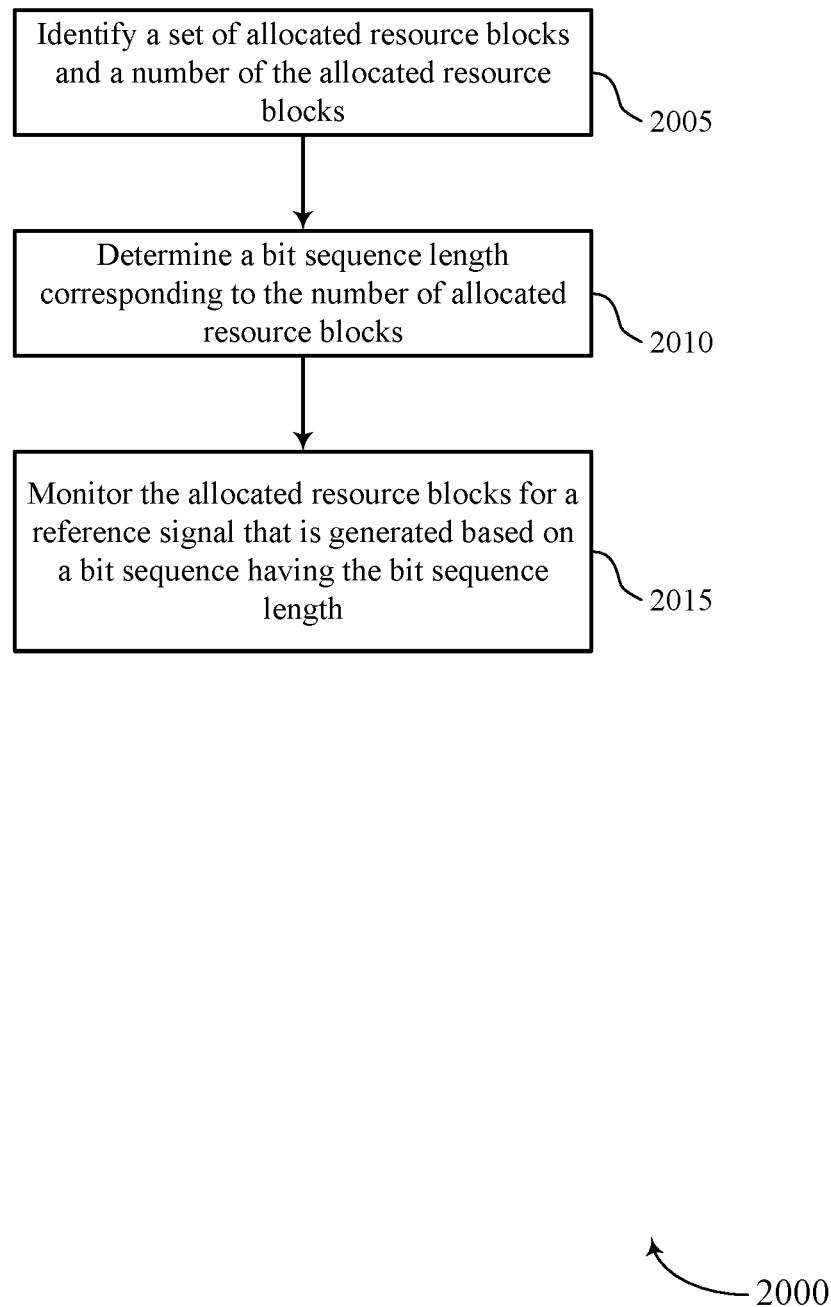

FIG. 20 shows a flowchart illustrating a method 2000 in accordance with aspects of the present disclosure. The operations of method 2000 may be implemented by a UE 115 or base station 105 or its components as described herein. For example, the operations of method 2000 may be performed by a communications manager as described with reference to FIGS. 12 through 14. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 2005 the UE 115 or base station 105 may identify a plurality of allocated resource blocks and a number of the allocated resource blocks. The operations of 2005 may be performed according to the methods described herein. In certain examples, aspects of the operations of 2005 may be performed by a resource block identifier as described with reference to FIGS. 12 through 14.

At 2010 the UE 115 or base station 105 may determine a bit sequence length corresponding to the number of allocated resource blocks. The operations of 2010 may be performed according to the methods described herein. In certain examples, aspects of the operations of 2010 may be performed by a bit sequence component as described with reference to FIGS. 12 through 14.

At 2015 the UE 115 or base station 105 may monitor the allocated resource blocks for a reference signal that is generated based at least in part on a bit sequence having the bit sequence length. The operations of 2015 may be performed according to the methods described herein. In certain examples, aspects of the operations of 2015 may be performed by a resource block monitoring component as described with reference to FIGS. 12 through 14.

Figure 21:
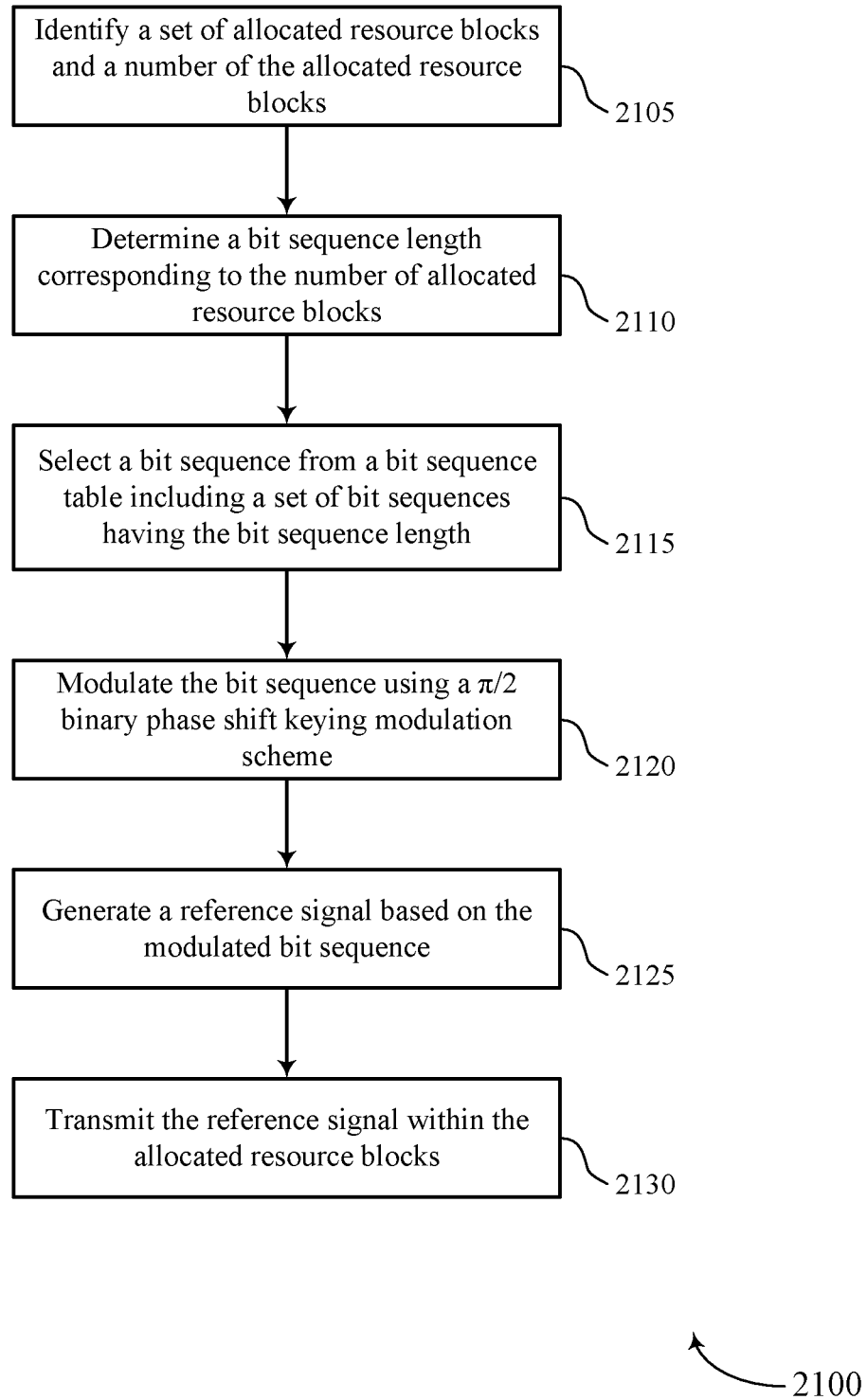

FIG. 21 shows a flowchart illustrating a method 2100 in accordance with aspects of the present disclosure. The operations of method 2100 may be implemented by a UE 115 or base station 105 or its components as described herein. For example, the operations of method 2100 may be performed by a communications manager as described with reference to FIGS. 12 through 14. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 2105 the UE 115 or base station 105 may identify a set of allocated resource blocks and a number of the allocated resource blocks. The operations of 2105 may be performed according to the methods described herein. In certain examples, aspects of the operations of 2105 may be performed by a resource block identifier as described with reference to FIGS. 12 through 14.

At 2110 the UE 115 or base station 105 may determine a bit sequence length corresponding to the number of allocated resource blocks. The operations of 2110 may be performed according to the methods described herein. In certain examples, aspects of the operations of 2110 may be performed by a bit sequence component as described with reference to FIGS. 12 through 14.

At 2115 the UE 115 or base station 105 may select a bit sequence from a bit sequence table including a set of bit sequences having the bit sequence length. If, for example, the UE 115 or base station 105 determines a bit sequence length of 12, the UE 115 or base station 105 may select a bit sequence from the bit sequence table 400 described in FIG. 4. In another example, the UE 115 or base station 105 may determine a bit sequence length of 12 and select a bit sequence from the bit sequence table 700 described in FIG. 7. If the UE 115 or base station 105 determines a bit sequence length of 18, the UE 115 or base station may select a bit sequence from the bit sequence table 500 described in FIG. 5 or the bit sequence table 800 described in FIG. 8. If the UE 115 or base station 105 determines a bit sequence length of 24, the UE 115 or base station 105 may select a bit sequence from the bit sequence table 600 described in FIG. 6 or the bit sequence table 900 described in FIG. 9. The operations of 2115 may be performed according to the methods described herein. In certain examples, aspects of the operations of 2115 may be performed by a bit sequence component as described with reference to FIGS. 12 through 14.

At 2120 the UE 115 or base station 105 may modulate the bit sequence using a $\pi/2$ binary phase shift keying modulation scheme. If, for example, the UE 115 or base station 105 selected the bit sequence from a bit sequence table described in FIG. 4, 5, or 6, the UE 115 or base station 105 may modulate the selected bit sequence according to Equation (1). If the UE 115 or base station 105 selected the bit sequence from a bit sequence table described in FIG. 7, 8, or 9, the UE 115 or base station 105 may modulate the selected bit sequence according to Equation (2). The operations of 2120 may be performed according to the methods described herein. In certain examples, aspects of the operations of 2120 may be performed by a modulation component as described with reference to FIGS. 12 through 14.

At 2125 the UE 115 or base station 105 may generate a reference signal based on the modulated bit sequence. The operations of 2120 may be performed according to the methods described herein. In certain examples, aspects of the operations of 2125 may be performed by a reference signal generator as described with reference to FIGS. 12 through 14.

At 2130 the UE 115 or base station 105 may transmit the reference signal within the allocated resource blocks. The operations of 2130 may be performed according to the methods described herein. In certain examples, aspects of the operations of 2130 may be performed by a reference signal transmitter as described with reference to FIGS. 12 through 14.

Figure 22:
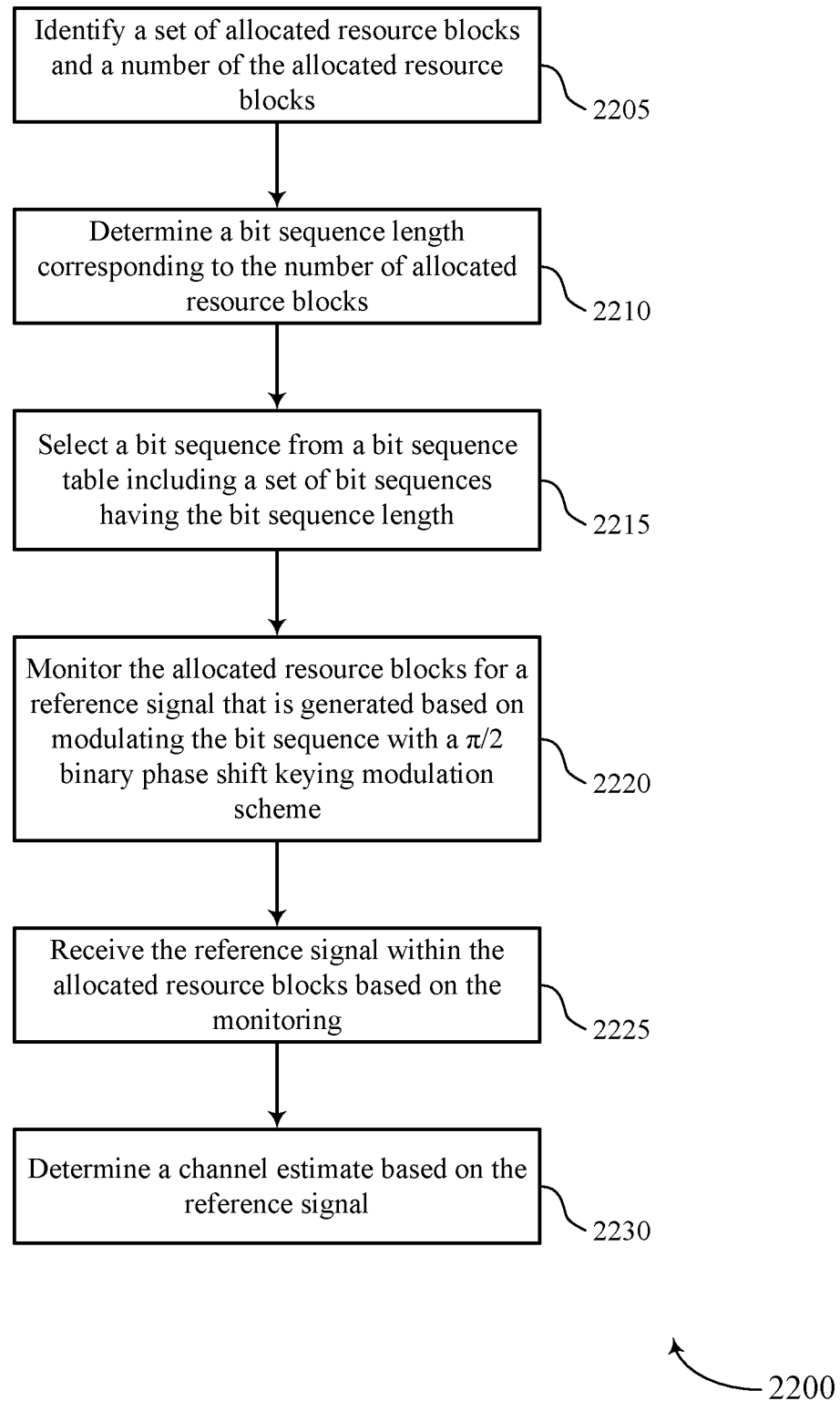

FIG. 22 shows a flowchart illustrating a method 2200 in accordance with aspects of the present disclosure. The operations of method 2200 may be implemented by a UE 115 or base station 105 or its components as described herein. For example, the operations of method 2200 may be performed by a communications manager as described with reference to FIGS. 12 through 14. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 2205 the UE 115 or base station 105 may identify a set of allocated resource blocks and a number of the allocated resource blocks. The operations of 2205 may be performed according to the methods described herein. In certain examples, aspects of the operations of 2205 may be performed by a resource block identifier as described with reference to FIGS. 12 through 14.

At 2210 the UE 115 or base station 105 may determine a bit sequence length corresponding to the number of allocated resource blocks. The operations of 2210 may be performed according to the methods described herein. In certain examples, aspects of the operations of 2210 may be performed by a bit sequence component as described with reference to FIGS. 12 through 14.

At 2215 the UE 115 or base station 105 may select a bit sequence from a bit sequence table including a set of bit sequences having the bit sequence length. The operations of 2215 may be performed according to the methods described herein. In certain examples, aspects of the operations of 2215 may be performed by a bit sequence component as described with reference to FIGS. 12 through 14.

At 2220 the UE 115 or base station 105 may monitor the allocated resource blocks for a reference signal that is generated based on modulating the bit sequence with a $\pi/2$ binary phase shift keying modulation scheme. The operations of 2220 may be performed according to the methods described herein. In certain examples, aspects of the operations of 2220 may be performed by a resource block monitoring component as described with reference to FIGS. 12 through 14.

At 2225 the UE 115 or base station 105 may receive the reference signal within the allocated resource blocks based on the monitoring. The operations of 2225 may be performed according to the methods described herein. In certain examples, aspects of the operations of 2225 may be performed by resource block monitoring component as described with reference to FIGS. 12 through 14.

At 2230 the UE 115 or base station 105 may determine a channel estimate based on the reference signal. The operations of 2230 may be performed according to the methods described herein. In certain examples, aspects of the operations of 2230 may be performed by the channel estimation component as described with reference to FIGS. 12 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
    identifying a plurality of allocated resource blocks and a number of the allocated resource blocks;
    determining a bit sequence length corresponding to the number of allocated resource blocks;
    identifying a bit sequence table from a plurality of bit sequence tables based at least in part on the bit sequence length, wherein each of the plurality of bit sequence tables corresponds to a different bit sequence length;
    selecting a bit sequence from the bit sequence table comprising a plurality of bit sequences having the bit sequence length;
    modulating the bit sequence using a π/2 binary phase shift keying modulation scheme; and
    transmitting the modulated bit sequence within the allocated resource blocks.

2. The method of claim 1, wherein the modulated bit sequence is orthogonal to at least one cyclically shifted version of the modulated bit sequence.

3. The method of claim 1, further comprising:
    modulating a data bit sequence using the π/2 binary phase shift keying modulation scheme to generate a modulated data bit sequence;
    generating a reference signal based at least in part on the modulated bit sequence, wherein transmitting the modulated bit sequence within the allocated resource blocks comprises transmitting the reference signal within the allocated resource blocks, wherein the reference signal is a demodulation reference signal; and
    transmitting the modulated data bit sequence within the allocated resource blocks, wherein a peak to average power ratio (PAPR) of tones transporting the modulated data bit sequence within the allocated resource blocks satisfies a PAPR threshold and a PAPR of tones transporting the reference signal within the allocated resource blocks satisfies the PAPR threshold.

4. The method of claim 1, wherein each bit sequence of the plurality of bit sequences included in the bit sequence table satisfies a cyclic autocorrelation threshold, or a frequency domain fluctuation threshold, or a cyclic cross-correlation threshold, or a peak to average power ratio (PAPR) threshold, or any combination thereof.

5. The method of claim 1, wherein the bit sequence length is 12 bits, or 18 bits, or 24 bits, and the bit sequence table comprises the plurality of bit sequences of the bit sequence length of 12 bits, or 18 bits, or 24 bits.

6. The method of claim 1, wherein identifying the number of allocated resource blocks comprises:
    determining that the number of allocated resource blocks satisfies a threshold.

7. The method of claim 1, further comprising:
    transmitting control information indicating the number of allocated resource blocks.

8. The method of claim 1, further comprising:
    transmitting control information indicating an index to a table to identify the bit sequence from a plurality of bit sequences included in the table.

9. The method of claim 1, further comprising:
    receiving a measurement report that comprises a channel estimate determined based at least in part on a reference signal generated from the modulated bit sequence.

10. A method for wireless communication at a wireless device, comprising:
    identifying a plurality of allocated resource blocks and a number of the allocated resource blocks;
    determining a bit sequence length corresponding to the number of allocated resource blocks;
    identifying a bit sequence table from a plurality of bit sequence tables based at least in part on the bit sequence length, wherein each of the plurality of bit sequence tables corresponds to a different bit sequence length;
    selecting a bit sequence from the bit sequence table comprising a plurality of bit sequences having the bit sequence length;
    monitoring the allocated resource blocks for a modulated bit sequence that is generated based at least in part on modulating the bit sequence with π/2 binary phase shift keying modulation scheme; and
    receiving the modulated bit sequence within the allocated resource blocks based at least in part on the monitoring.

11. The method of claim 10, wherein the modulated bit sequence is orthogonal to at least one cyclically shifted version of the modulated bit sequence.

12. The method of claim 10, further comprising:
    monitoring the allocated resource blocks for a reference signal that is generated based at least in part on the modulated bit sequence;
    receiving the reference signal and a modulated data bit sequence within the allocated resource blocks, wherein the reference signal is a demodulation reference signal and a peak to average power ratio (PAPR) of tones transporting the modulated data bit sequence within the allocated resource blocks satisfies a PAPR threshold and a PAPR of tones transporting the reference signal within the allocated resource blocks satisfies the PAPR threshold; and determining a channel estimate based at least in part on the reference signal.

13. The method of claim 12, further comprising:
decoding the modulated data bit sequence from the allocated resource blocks based at least in part on the channel estimate.

14. The method of claim 10, wherein each bit sequence of the plurality of bit sequences included in the bit sequence table satisfies a cyclic autocorrelation threshold, or a frequency domain fluctuation threshold, or a cyclic cross-correlation threshold, or a peak to average power ratio (PAPR) threshold, or any combination thereof.

15. The method of claim 10, wherein the bit sequence length is 12 bits, or 18 bits, or 24 bits, and the bit sequence table comprises the plurality of bit sequences of the bit sequence length of 12 bits, or 18 bits, or 24 bits.

16. The method of claim 10, wherein determining the bit sequence length comprises:
determining the bit sequence length based at least in part on the number of allocated resource blocks.

17. The method of claim 10, wherein identifying the number of allocated resource blocks comprises:
receiving control information indicating the number of allocated resource blocks.

18. The method of claim 10, further comprising:
receiving control information indicating an index to a table to identify the bit sequence from a plurality of bit sequences included in the table.

19. The method of claim 10, wherein identifying the number of allocated resource blocks comprises:
determining that the number of allocated resource blocks satisfies a threshold.

20. An apparatus for wireless communication, comprising:
a processor;
memory in electronic communication with the processor; and
instructions stored in the memory and executable by the processor to cause the apparatus to:
identify a plurality of allocated resource blocks and a number of the allocated resource blocks;
determine a bit sequence length corresponding to the number of allocated resource blocks;
identify a bit sequence table from a plurality of bit sequence tables based at least in part on the bit sequence length, wherein each of the plurality of bit sequence tables corresponds to a different bit sequence length;
select a bit sequence from the bit sequence table comprising a plurality of bit sequences having the bit sequence length;
modulate the bit sequence using a π/2 binary phase shift keying modulation scheme; and
transmit the modulated bit sequence within the allocated resource blocks.

21. The apparatus of claim 20, wherein the modulated bit sequence is orthogonal to at least one cyclically shifted version of the modulated bit sequence.

22. The apparatus of claim 20, wherein the instructions are further executable by the processor to cause the apparatus to:

modulate a data bit sequence using the π/2 binary phase shift keying modulation scheme to generate a modulated data bit sequence;

generate a reference signal based at least in part on the modulated bit sequence, wherein transmitting the modulated bit sequence within the allocated resource blocks comprises transmitting the reference signal within the allocated resource blocks, wherein the reference signal is a demodulation reference signal; and configure a transmitter to transmit the modulated data bit sequence within the allocated resource blocks, wherein a peak to average power ratio (PAPR) of tones transporting the modulated data bit sequence within the allocated resource blocks satisfies a PAPR threshold and a PAPR of tones transporting the reference signal within the allocated resource blocks satisfies the PAPR threshold.

23. The apparatus of claim 20, wherein each bit sequence of the plurality of bit sequences included in the bit sequence table satisfies a cyclic autocorrelation threshold, or a frequency domain fluctuation threshold, or a cyclic cross-correlation threshold, or a peak to average power ratio (PAPR) threshold, or any combination thereof.

24. An apparatus for wireless communication, comprising:
a processor;
memory in electronic communication with the processor; and instructions stored in the memory and executable by the processor to cause the apparatus to:
identify a plurality of allocated resource blocks and a number of the allocated resource blocks;
determine a bit sequence length corresponding to the number of allocated resource blocks;
identify a bit sequence table from a plurality of bit sequence tables based at least in part on the bit sequence length, wherein each of the plurality of bit sequence tables corresponds to a different bit sequence length;
select a bit sequence from the bit sequence table comprising a plurality of bit sequences having the bit sequence length;
monitor the allocated resource blocks for a modulated bit sequence that is generated based at least in part on modulating the bit sequence with a π/2 binary phase shift keying modulation scheme; and
receive the modulated bit sequence within the allocated resource blocks based at least in part on the monitoring.

25. The apparatus of claim 24, wherein the modulated bit sequence is orthogonal to at least one cyclically shifted version of the modulated bit sequence.

26. The apparatus of claim 24, wherein the instructions are further executable by the processor to cause the apparatus to:
configure a transceiver to monitor the allocated resource blocks for a reference signal that is generated based at least in part on the modulated bit sequence;
configure the transceiver to receive the reference signal and a modulated data bit sequence within the allocated resource blocks, wherein a peak to average power ratio (PAPR) of tones transporting the modulated data bit sequence within the allocated resource blocks satisfies a PAPR threshold and a PAPR of tones transporting the reference signal within the allocated resource blocks satisfies the PAPR threshold; and
determine a channel estimate based at least in part on the reference signal.

27. The apparatus of claim 26, wherein the instructions are further executable by the processor to cause the apparatus to:

decode the modulated data bit sequence from the allocated resource blocks based at least in part on the channel estimate, wherein the reference signal is a demodulation reference signal.

\* \* \* \* \*